US006397021B2

(12) United States Patent
Hayashi et al.

(10) Patent No.: US 6,397,021 B2
(45) Date of Patent: May 28, 2002

(54) IMAGE FORMING APPARATUS

(75) Inventors: Kuniharu Hayashi, Ube; Tsutomu Yamane, Tokyo; Masamitsu Nagamine, Tokyo; Hiroyuki Yajima, Tokyo; Tatsuya Murakami, Tokyo, all of (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/797,030

(22) Filed: Feb. 28, 2001

(30) Foreign Application Priority Data

Feb. 29, 2000 (JP) ....................................... 2000-053322
Feb. 29, 2000 (JP) ....................................... 2000-053332
Mar. 15, 2000 (JP) ....................................... 2000-072137

(51) Int. Cl.[7] ................................................ G03B 15/20
(52) U.S. Cl. ........................... 399/69; 219/216; 399/45; 399/70
(58) Field of Search ............................ 399/67, 68, 69, 399/70, 334, 45; 219/216

(56) References Cited

U.S. PATENT DOCUMENTS 6,314,252 B1 * 11/2001 Matsumoto .................. 399/45

FOREIGN PATENT DOCUMENTS

JP 6-186883 * 7/1994
JP 7-104608 * 4/1995
JP 10-301435 * 11/1998

* cited by examiner

*Primary Examiner*—Joan Pendegrass
(74) *Attorney, Agent, or Firm*—Akin, Gump, Strauss, Hauer & Feld, L.L.P.

(57) ABSTRACT

An image forming apparatus has a fixing unit. A heat roller heats a toner image on a print medium to fuse the toner image. A first temperature detector is in contact with a longitudinal end portion of the heat roller, and generates a first temperature data. A second temperature detector opposes the heat roller and is in proximity to a substantially middle portion of the heat roller. The second temperature detector generates a second temperature data. Depending on the first temperature data and the second temperature data, a controller performs temperature control either in a first mode where the heater is energized such that the first temperature data is equal to a first target value, or in a second mode where the heater is energized such that second temperature data is equal to a second target value.

15 Claims, 28 Drawing Sheets

IMAGE FORMING APPARATUS

BACKGROUND OF THE INVENTION

Field of the Invention

The present invention relates to an image-forming apparatus such as a laser printer in which electrophotography is used to form an image on print paper, and more particularly to a temperature-controlling apparatus that controls the temperature of a fixing unit that fixes an image transferred onto the print paper.

With an electrophotographic image-forming apparatus, laser light illuminates a photoconductive drum to form an electrostatic latent image thereon. The electrostatic latent image is then developed with toner into a toner image. Then, the toner image is transferred from the photoconductive drum to print paper. Finally, the toner image on the print paper is fixed at the fixing unit and then the paper is discharged from the fixing unit.

FIG. 30 illustrates a fixing unit and the associated control sections of a conventional image-forming apparatus.

The conventional image-forming apparatus will be described with reference to FIG. 30.

A fixing unit 100 includes a heat roller 1, a pressure roller 20, a heater 2, two springs 21, and a temperature detector 30. The heat roller 1 heats a toner image, transferred to a print medium such as A5 size paper 70 or A4 size paper 80, to fix the toner image. The heater 2 generates heat and supplies the heat to the heat roller 1. The pressure roller 20 is rotatably supported by a shaft 22 and rotates in pressure contact with the heat roller 1. The springs 21 are disposed at longitudinal ends of the shaft 22 and urge the shaft 22 against the heat roller 1 such that the pressure roller 20 is in pressure contact with the heat roller 1. The temperature detector 30 is in contact with the outer circumferential surface of the heat roller 1 to detect the temperature of the heat roller 1.

In order to uniformly heat the toner image on the print medium 70 or 80, the heat roller 1 takes the shape of a long, hollow cylinder made of a highly heat conductive metal material. The heat roller 1 has a rubber material formed on an outer circumferential surface of the cylinder with a resin coating on the rubber. The coating is highly heat resistant and has good mold-releasing characteristic. The heat roller 1 and the pressure roller 20 are rotated in directions shown by arrows 90 and 91 of FIG. 30, respectively.

The heater 2 takes the form of, for example, a halogen lamp that extends in the longitudinal direction of the heat roller 1 but is not in contact with the heat roller 1.

The pressure roller 20 is a rubber roller in pressure contact with the heat roller 1. The pressure roller 20 is rotated such that the print medium 70 or 80 is pulled in between the heat roller 1 and the pressure roller 20 and is advanced in a direction shown by arrow 92.

The temperature detector 30 takes the form of, for example, a temperature measuring thermistor. The temperature detector 30 is disposed, on the circumferential surface of the heat roller 1 outside of a paper path in which the A4 size paper (medium 80) passes. In this specification, A4 size paper in portrait orientation is a maximum size of print medium that the fixing unit can accept. Specifically, the temperature detector 30 is a distance L2 (e.g., 0–10 mm) away from the paper path.

A control block 200 shown in FIG. 30 will be described.

A main controller 11 controls the supply of electric power to the heater 2, transport of the print medium 70 or 80, and drive of the pressure roller 20. An analog/digital (A/D) converter 12 that converts temperature data in analog form detected by the temperature detector 30 into a digital form that can be processed in the main controller 11. A power switch 13 that switches on and off the electric power supplied to the heater 2 from a power supply 14 under the control of the main controller 11. In accordance with the instructions from the main controller 11, a drive controller 15 drives the drive source 16 in the form of, for example, a motor that drives the pressure roller 20 in rotation. A memory 17 stores a control program for the main controller 11 and control data. The operating panel 18 includes an input section 18b and a display section 18*a*. The input section 18b allows the user to set the size of print paper and print density prior to printing. The display section 18*a* displays current settings and messages to the operator.

The warm-up operation of the aforementioned conventional image-forming apparatus is performed as follows:

For example, upon power up, the warm-up operation starts. The main controller 11 causes the power switch 13 to shift from an OFF position to an ON position, so that the power supply 14 supplies electric power to the heater 2. At the same time, the main controller 11 causes the drive controller 15 to drive the motor 16 into rotation. Thus, the motor 16 drives the pressure roller 20 and heat roller 1 in rotation in the directions shown by arrows 90 and 91. In the warm-up operation, when the temperature detected by the detector 30 reaches a target temperature (e.g., 170° C.) at which the fixing operation can be adequately carried out, the supply of electric power from the power supply to the heater 2 is interrupted. Thereafter, feedback control is performed through a loop (the detector 30→A/D converter 12→main controller 11→power switch 13→heater 2→heat roller 1), thereby maintaining the detected temperature to the target temperature.

The operation when the image-forming apparatus receives print data from a host apparatus will be described.

Upon receiving the print data from the host apparatus, the main controller 11 provides a command to the power switch 13 so that the power switch 13 directs electric power to the heater 2 as required. The main controller 11 also provides a command to the drive controller 15, thereby causing the drive controller 15 to drive the motor 16 to drive the pressure roller 20 and heat roller 1 in rotation. Then, the main controller 11 causes the print medium 70 or 80 to be fed to the image-forming section from a paper cassette, not shown. A toner image is transferred onto the print medium 70 or 80 and the print medium is advanced by a registry roller, not shown, in a direction shown by white arrow 92 and abuts the pressure roller 20. The print medium is pulled in between the rotating heat roller 1 and the pressure roller 20. When the print medium passes between the heat roller 1 and pressure roller 20, the toner on the print medium 70 or 80 is melted and permanently adheres to the print medium due to the pressure applied by the pressure roller 20. The print medium 70 or 80 is then discharged with a transport device, not shown, to the outside of the printer.

As described above, the temperature detector 30 is disposed in contact with an area outside of the surface of the heat roller 1 that contacts the print medium. The electric power supplied to the heater 2 is switched on and of f such that a temperature detected by the temperature detector 30 is maintained at a predetermined value.

When the print medium 70 or 80 passes between the heat roller 1 and pressure roller 20, the print medium absorbs heat from the heat roller 1 to fuse the toner deposited thereon, thereby causing the temperature of the heat roller 1 to decrease. This creates a temperature difference between an area on the heat roller 1 that contacts the print medium and an area on the heat roller 1 that does not contact the print medium.

For example, when A4 size paper (print medium 80) passes through an area Lb, the heat roller 1 loses heat to the A4 size paper, creating a temperature difference between the area Lb and a point E. However, the distance L2 between the area Lb and the point E is very short, e.g., 0–10 mm. Thus, the temperature difference between the area Lb and the point E is not large, so that the temperature in the area Lb can be maintained at a predetermined target temperature by feedback control using a temperature detected by the temperature detector 30 in contact with the point E.

Also, when, for example, A5 size paper (print medium 70) smaller than A4 passes through the area 1*a*, the heat roller 1 loses heat to the A5 size paper, creating a temperature difference between the area 1*a* and the point E. However, the distance L1 between the area 1*a* and the point E is much longer than L2. Thus, the heat does not transfer so fast through the heat roller 1, so that a temperature difference between the area 1*a* and the point E is large. Despite the fact that the temperature at the point E can be controlled to a predetermined target value, the temperature in the area 1*a* is not sufficient for proper fixing. In other words, when a plurality of pages are printed continuously, the temperature difference increases. Thus, the aforementioned conventional controlling method cannot maintain the proper temperature of the heat roller 1 in direct contact with a narrow-width print medium.

SUMMARY OF THE INVENTION

The present invention was made in view of the aforementioned drawbacks of the conventional apparatus.

An object of the invention is to provide an image-forming apparatus for printing on print media having a variety of widths wherein when pages of a small-width print medium are printed continuously, the temperature of the heat roller in contact with the print medium is maintained at a constant temperature.

A fixing unit is used in an image forming apparatus. A heat roller heats a toner image on a print medium. A heater is disposed in the heat roller and supplies heat to the heat roller. A first temperature detector is in the form of a thermistor. The first temperature detector is disposed in contact with a first surface area of an end portion of the heat roller outside of a second surface area of the heat roller with which the print medium passes in contact. The first temperature detector generates a first temperature data. A second temperature detector is disposed to oppose the heat roller in proximity to a substantially middle portion of the second surface, and generates a second temperature data. A controller controls supply of electric power to the heater. Based on the first temperature data and the second temperature data, the controller switches between a first temperature control mode and a second temperature control mode. The first temperature control mode is a mode where the controller controls supply of electric power to the heater such that the first temperature data is equal to a first target value. The second temperature control mode is a mode where the controller controls supply of electric power to the heater such that the second temperature data is equal to a second target value.

When a fixing operation of the print medium has been completed, the controller switches from the second temperature control mode to the first temperature control mode.

If the second temperature data becomes below a certain value during the first temperature control mode, the controller switches from the first temperature control mode to the second temperature control mode.

When continuous printing is being performed in the first temperature control mode and a number of printed pages reaches a certain value (e.g., second target value minus 15° C.), the controller switches from the first temperature control mode to the second temperature control.

The controller controls supply of electric power to the heater in the first temperature control mode during a standby state where the image-forming apparatus waits for a print command. When the print medium has a width smaller than a reference width and the image forming apparatus receives a print command of continuous printing, the controller controls supply of electric power to the heater in the second temperature control mode.

The heater includes a first heater element having a first length and a second heater element having a second length shorter than the first length. When printing is performed on the print medium having a smaller width than a reference width, the controller supplies electric energy to the second heater element. If the first temperature data decreases below a lower limit, then the controller supplies electric energy to the second heater element and the first heater element.

When the first temperature data becomes equal to the first target value, the controller sets the second temperature data as the second target value.

The controller performs a correction operation in which the second temperature data is corrected to determine an approximate actual surface temperature of the heat roller. The controller stores a first correction value and a second correction value, the first correction value being a difference between the first temperature data and a first item of data that describes the actual surface temperature for a proper fixing operation, and the second correction value being a difference between the first temperature data and the second temperature data. When the controller is performing a printing operation, the controller adds the first correction value and second correction value to the second temperature data, thereby determining the approximate actual surface temperature of the heat roller. The controller performs a warm-up operation where when the print medium is not being passing through the fixing unit, the heat roller is rotated and the controller supplies electric power to the heater such that the actual surface temperature becomes the first item of data. The second correction value is determined immediately before the warm-up operation is halted. The controller detects an initial value (e.g., second temperature data) of a surface temperature of the heat roller after power up and before the controller supplies electric power to the heater. The controller performs the warm-up operation for a period of time in accordance with the initial value, the period of time being increased stepwise as the initial value decreases.

The second temperature detector opposes the heat roller with a gap therebetween. The controller incorporates a control program in which a size of the gap is determined based on the first temperature data, the second temperature data, and the first items of data, and then the fixing temperature is controlled in accordance with the size of the gap.

When the first temperature data exceeds a certain value during the second temperature control mode, the controller halts printing; wherein when the first temperature data decreases to a third target value after the first temperature has exceeded the certain value, the controller resumes printing.

When the first temperature data exceeds a first value during the second temperature control mode; the controller causes the print medium to be advanced at a low speed. When the first temperature data decreases to a second value after the controller has caused the print medium to be advanced at a low speed, the controller causes the print medium to be advanced at a high speed.

The controller incorporates a temperature control program in which an amplitude of ripple in the second temperature data is determined and the fixing temperature of the heat roller is corrected in accordance with the amplitude of ripple.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Embodiments of the invention will be described in detail with reference to the accompanying drawings.

First Embodiment

{Construction}

Figures 1A, 1B:
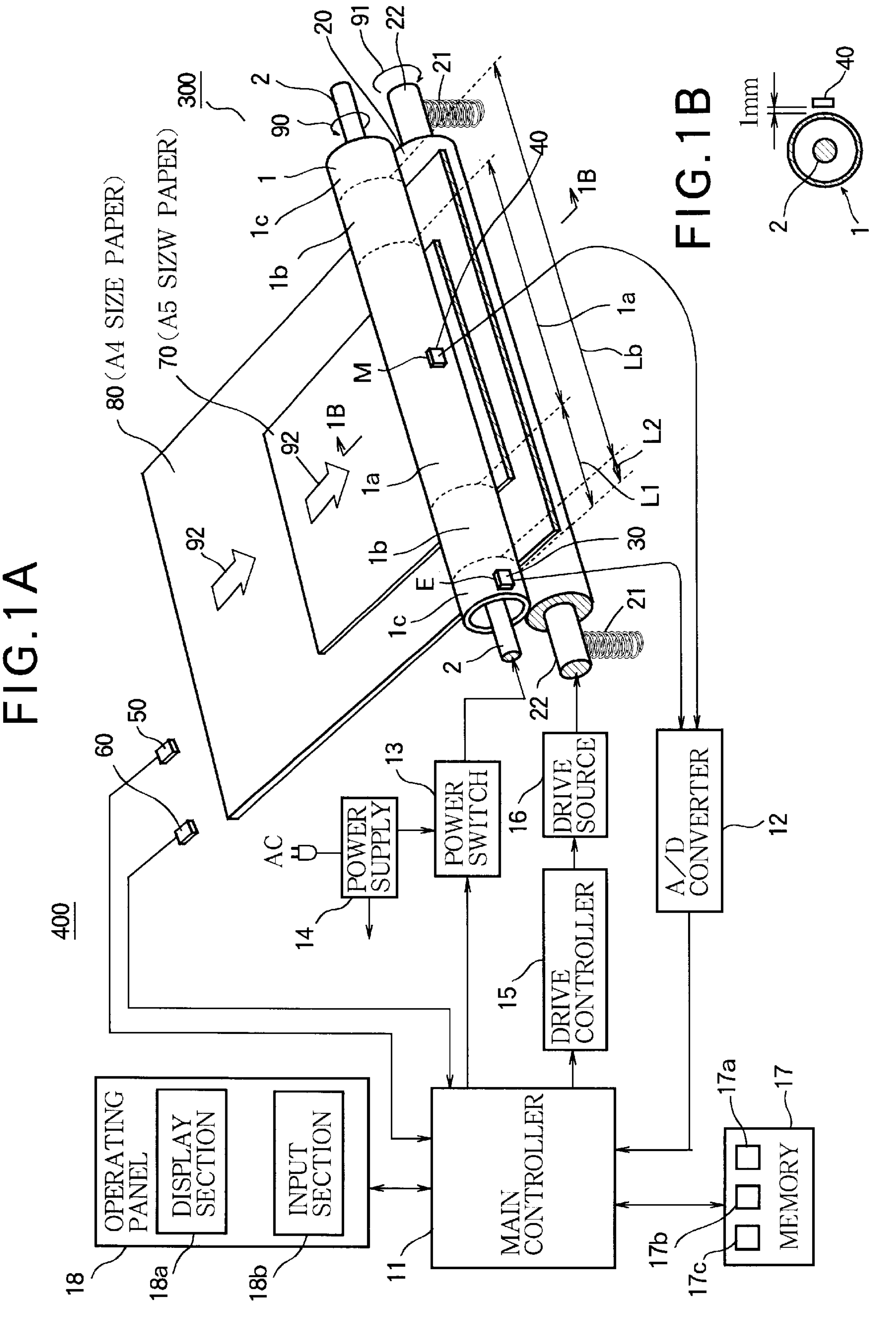
FIG. 1A is a perspective view of a fixing unit and a control block diagram of the fixing unit according to a first embodiment.
FIG. 1B is a cross-sectional view taken along line II—II of FIG. 1A.

FIG. 1A is a perspective view of a fixing unit and a control block diagram of the fixing unit according to a first embodiment.

FIG. 1B is a cross-sectional view taken along line II—II of FIG. 1A.

Figure 30:
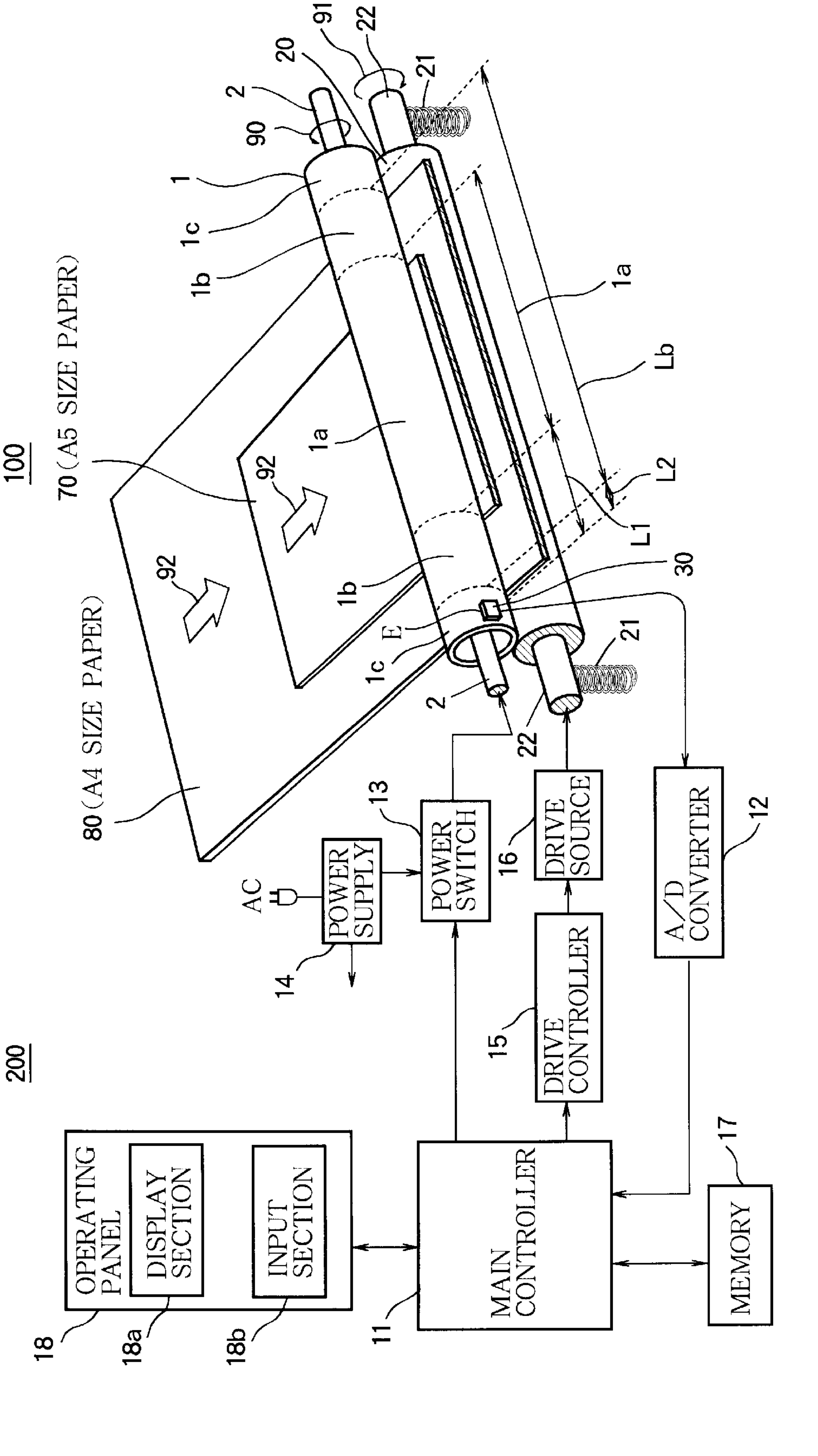
FIG.30 CONVENTIONAL ART
FIG. 30 illustrates a fixing unit and the associated control sections of a conventional image-forming apparatus.

A fixing unit 300 of FIG. 1A differs from the conventional fixing unit of FIG. 30 in that a non-contact type temperature detector 40 is disposed substantially in the longitudinal middle of a heat roller 1 in which a heater 2 extends and is very close to the heat roller but not in contact therewith. The heater 2 takes the form of, for example, a halogen lamp. The temperature detector 40 is about 1 mm spaced apart from the circumferential surface of the heat roller 1 that opposes an A5 size print medium, so that the toner on the heat roller 1 is prevented from migrating to the temperature detector. The temperature detector 40 is, for example, a temperature-detecting thermistor.

The temperature detector 40 need not be in the longitudinal middle of the heat roller 1, providing that the temperature detector 40 is substantially at the middle of a surface area of the heat roller 1 in contact with the A5 size print medium. A contact type temperature detector 30 is disposed on the circumferential surface of the heat roller 1 outside of a paper path in which A4 size paper (medium 80) passes. The temperature detector 30 is in contact with the surface of the heat roller 1.

The non-contact type temperature detector 40 should be as close to the surface of the heat roller 1 as possible. However, if the temperature detector 40 is too close to the heat roller 1, the temperature detector 40 may move into contact engagement with the heat roller 1 when the heat roller 1 vibrates during rotation. If the temperature detector 40 contacts the surface of the heat roller 1, toner will migrate from the heat roller 1 to the temperature detector 40 with the result that the temperature detector 40 becomes unable to accurately detect the surface temperature of the heat roller. The distance between the temperature detector 40 and the surface of the heat roller 1 is of about 1 mm to ensure that the temperature detector 40 will not contact the heat roller 1.

Paper-size detectors 50 and 60 take the form of, for example, a photo coupler and are disposed in the transport path of the print medium 70 or 80. The main controller 11 receives the outputs of the paper-size detectors 50 and 60 and the temperature detectors 30 and 40. Based on the outputs of the paper size detectors 50 and 60, the main controller 11 determines whether the print paper being transported is A4 size paper or A5 size paper. If the paper-size detector 50 generates an output but the paper-size detector 60 does not, then the main controller 11 determines that the paper being transported is A5 size paper. If both the paper-size detectors 50 and 60 generate their outputs, the main controller 11 determines that the paper being transported is A4 size paper.

The control block 400 of FIG. 1A differs from the conventional control block of FIG. 30 in that the control block 400 operates under another temperature control program and has a storage area 17*b* and a storage area 17*c*. The storage area 17*b* stores target temperatures TTE1 and TTE2 for the temperature detector 30, and the storage area 17*c* stores target temperatures TTM1 and TTM2 for the contact temperature detector 40. The control block 400 is so configured because the image-forming apparatus uses two temperature detectors 30 and 40 instead of one temperature detector.

{Warm-up Operation}

Figure 2:
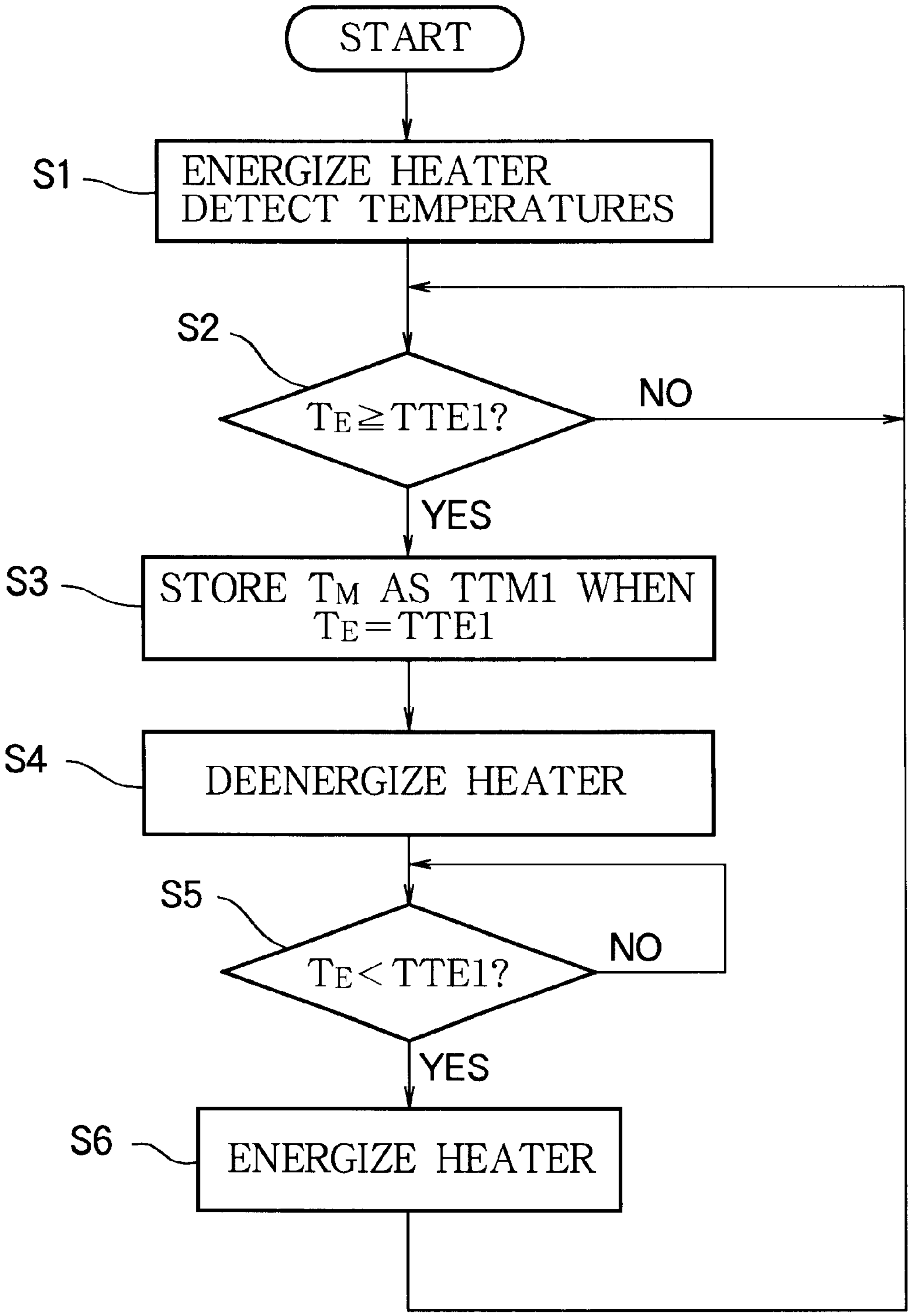
FIG. 2 is a flowchart illustrating a warm-up operation in the first embodiment.

FIG. 2 is a flowchart illustrating a warm-up operation in the first embodiment.

At step S1, when the operator turns on the image-forming apparatus, the heater 2 is energized and the temperature detectors 30 and 40 begin to detect the temperatures of the heat roller 1. Thus, the temperature of the heat roller 1 starts to increase from room temperature. At step S2, a decision is made to determine whether temperature $T_E$ detected by the temperature detector 30, is higher than the target temperature TTE1 for the temperature detector 30. For example, the target temperature TTE1 is 170° C. for a paper speed of 2 in./sec and 200° C. for a paper speed of 4 in./sec. If $T_E$<TTE1 at step S2, then the program repeats step S2 until $T_E$≧TTE1. If $T_E$≧TTE1 at step S2, then the program proceeds to step S3 where the main controller 11 stores a temperature $T_M$ detected by the temperature detector 40 into the storage area 17*c*, the detected temperature $T_M$ being used as a target temperature TTM1 for the temperature detector 40 during the operation illustrated in FIG. 3. The temperature $T_E$ of the heat roller 1 goes up and reaches TTE1 and then exceeds TTE1. The step S2 is actually carried out in a very short time and repeated many times. Therefore, when $T_E$ is substantially equal to TTE1, the answer at step S2 is YES and the target temperature TTM1 stored in the storage area 17*c* can be considered to be a value of $T_M$ when the $T_E$=TTE1. For example, the target temperature TTM1 stored in the area 17*c* is 155° C. for the paper speed of 2 in./sec and 170° C. for the paper speed of 4 in./sec. At step S4, the heater 1 is de-energized. At step S5, a decision is made to determine whether $T_E$<TTE1. If the answer is NO at step S5, the program repeats step S5 until $T_E$<TTE1. If the answer is YES at step S5, the program proceeds to step S6 where since $T_E$<TTE1, the heater 2 is again turned on and the program jumps back to step S2.

With the warm-up operation in FIG. 2, a feedback control is carried out such that the temperature $T_E$ becomes equal to the target temperature TTE1. Further, the target temperature TTM1 for the temperature detector 40 is determined based on the temperature $T_M$ 40 when the temperature $T_E$ reaches the target temperature TTE1.

{Temperature Control of the First Embodiment}

Figure 3:
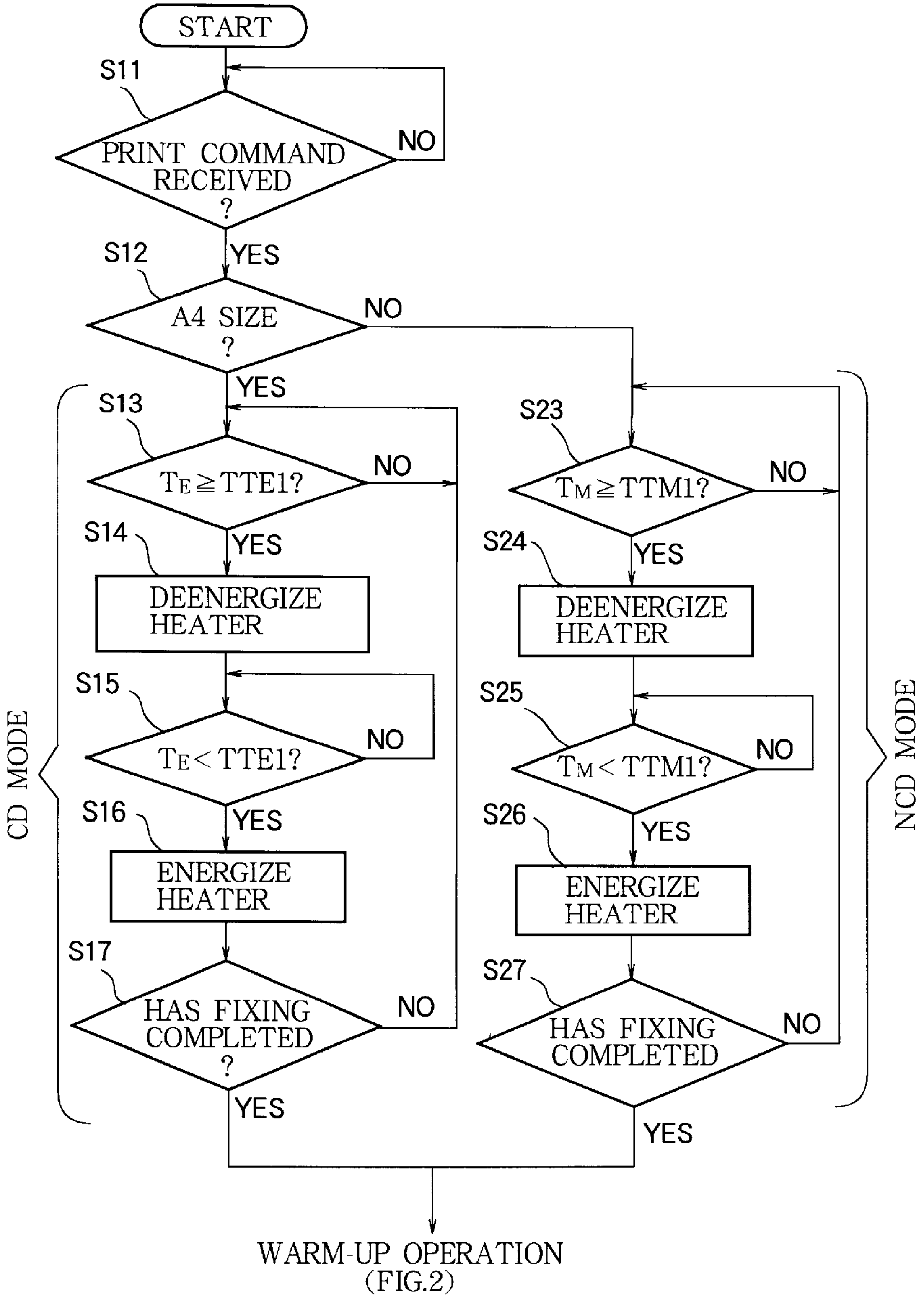
FIG. 3 is a flowchart illustrating a temperature control of the fixing unit according to the first embodiment.

FIG. 3 is a flowchart illustrating a temperature control of the fixing unit according to the first embodiment.

At step S11, a decision is made to determine whether a command for printing has been input by the operator through the input section 18*b* of the operating panel 18. If the answer is NO at step S11, then the program returns to step S11. If the answer is YES at step S11, then the program proceeds to step S12 where a decision is made to determine whether the print paper transported to the fixing unit is A4 size paper (print paper having a maximum width in portrait orientation). If the paper is A4 size paper, then the program proceeds to step S13, and if the paper size is not A4, then the program proceeds to step S23. In other words, the main controller 11 switches between a temperature control (S13–S17) based on the output of the contact type temperature detector 30 and a temperature control (S23–S27) based on the output of the non-contact type temperature detector 40. The temperature control performed at steps S13–S17 is based on the temperature $T_E$ detected by the contact type temperature detector 30 and is referred to as a contact detector mode or CD mode hereinafter. The temperature control performed at steps S23–S27 is based on the temperature $T_M$ detected by the contact type temperature detector 40 and referred to as a non-contact detector mode or NCD mode hereinafter.

In the CD mode, electric power to the heater 2 is turned on and off to control the temperature of the heat roller 1 such that $T_E$ becomes equal to TTE1.

In the NCD mode, electric power to the heater 2 is turned on and off to control the temperature of the heat roller 1 such that $T_M$ becomes equal to TTM1. The two modes of temperature control are selectively performed in accordance with the size of the print medium; A4 size or A5 size.

{Temperature Control in the CD Mode}

At step S13, a decision is made to determine whether $T_E$≧TTE1. If $T_E$≧TTE1, the program proceeds to step S14, and if $T_E$<TTE1, the program repeats step S13. At step S14, the heater is de-energized. At step S15, a decision is made to determine whether $T_E$<TTE1. If the answer is YES at step S15, the program proceeds to step S16 where the heater 2 is again energized, and then proceeds to step S17. If the answer is NO at step S15, the program repeats step S15. At step S17, a decision is made to determine whether the fixing operation has been completed. If the answer is YES at step 17, then the program returns to the warm-up operation shown in FIG. 2. If the answer is NO at step S17, then the program loops back to step S13.

{Temperature Control in the NCD Mode}

At step S23, a decision is made to determine whether $T_M \geqq$TTM1. TTM1 is the target temperature stored in the area 17*c* at step S3. Other experimental value may be used in place of TTM1. If the answer is YES at step S23, the program proceeds to step S24 where the heater 2 is de-energized. If the answer is NO a step S23, the program repeats step S23. At step S25, a decision is made to determine whether $T_M$<TTM1. If. the answer is NO at step S25, the program repeats step S25. If the answer is YES at step S25, the program proceeds to step S26 where the heater 2 is energized again, and then proceeds to step S27 where a decision is made to determine whether the fixing operation has been completed. If the answer is YES at step S27, then the program jumps back to the warm-up operation of FIG. 2. If the answer is NO at step S27, then the program loops back to step S23 where a decision is made to determine whether $T_M \geqq$TTM1.

Figure 4:
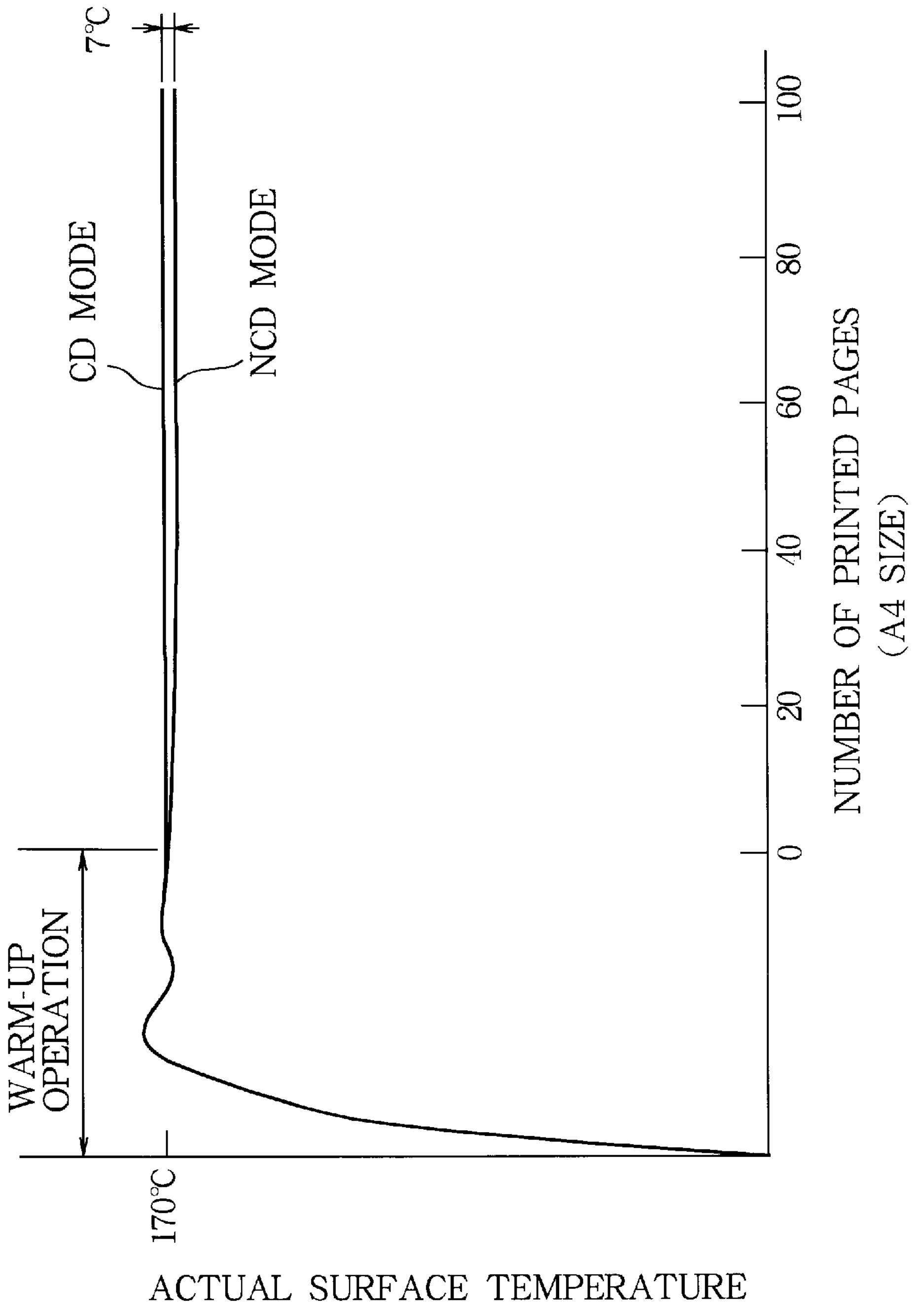
FIG. 4 shows the relationship between the number of continuously printed pages and the temperature at the middle portion of the heat roller 1 when printing is performed on A4 size paper.

FIG. 4 shows the relationship between the number of continuously printed pages and the temperature at the middle portion of the heat roller 1 when printing is performed on A4 size paper 80. FIG. 4 compares the results obtained in the aforementioned two temperature control modes: the CD mode and the NCD mode.

Figure 5:
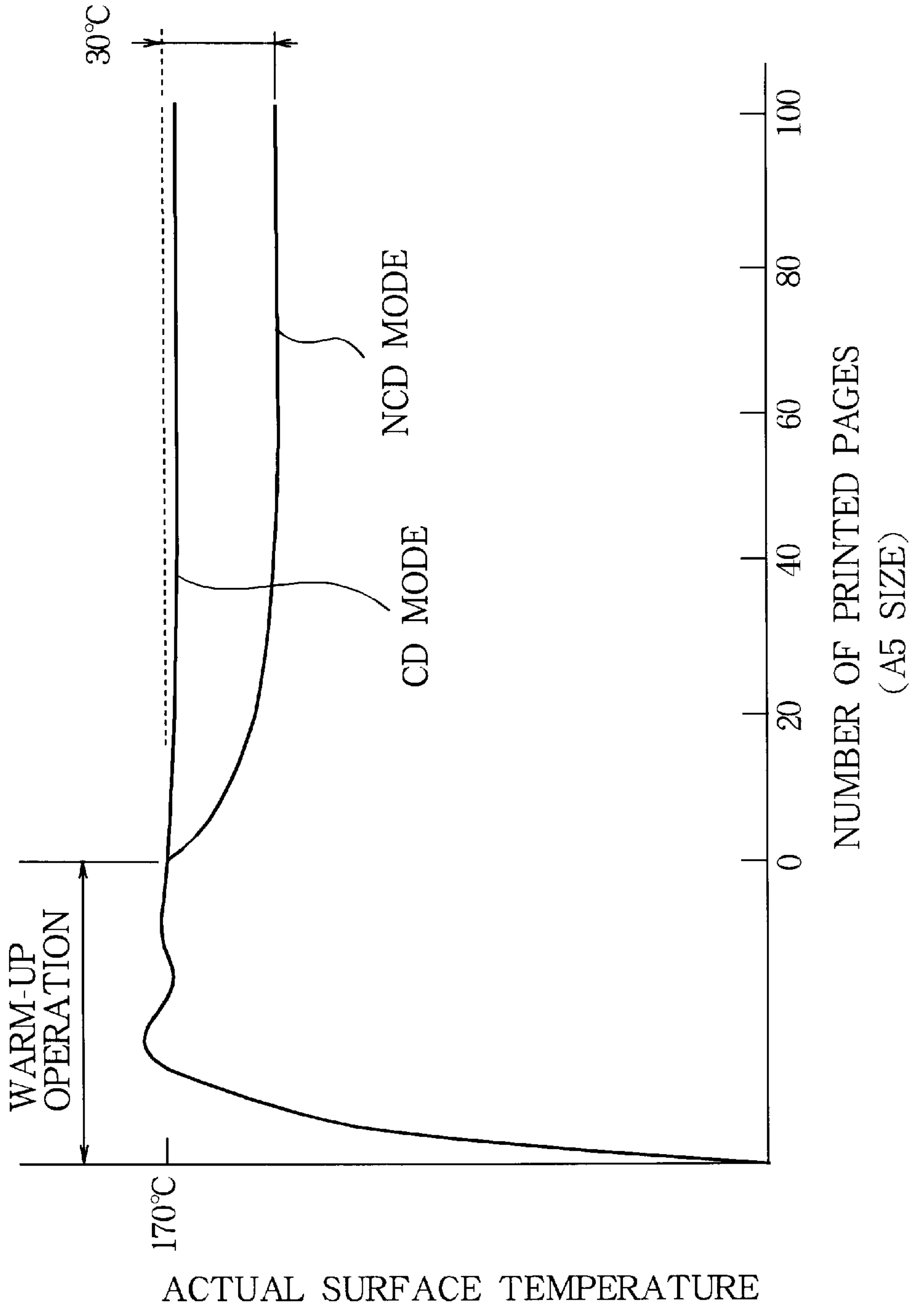
FIG. 5 is a graph similar to FIG. 4 and shows the relationship between the number of continuously printed pages and the temperature at the middle portion of the heat roller 1 when printing is performed on A5 size paper.

FIG. 5 is a graph similar to FIG. 4 and shows the relationship between the number of continuously printed pages and the temperature at the middle portion of the heat roller 1 when printing is performed on A5 size paper 70.

The temperature at the middle of the heat roller 1 was measured with a contact type temperature measuring thermistor. The print medium was transported at a paper speed of 2 in./sec, the target value of the surface temperature was 170° C., and the maximum acceptable width of print medium was 8.5 inches (letter size).

As is clear from FIG. 4, when continuous printing of 100 pages is performed on A4 size print medium 80 in the CD mode, there is no significant difference between the target value of the surface temperature and the actual surface temperature. However, when the temperature is controlled in the NCD mode, the actual surface temperature was about 30° C. below the target value of 170° C. as shown in FIG. 5. This is because a surface area 1*a* of the heat roller 1 in contact with the A5 size print medium 70 loses heat to the print medium 70 and therefore the temperature of the surface area 1*a* decreases, while a surface area 1*b* of the heat roller 1 not in contact with the print medium 70 does not lose a significant amount of heat to the print medium 70 and therefore the temperature does not decrease.

Thus, it is advantageous that when continuous printing is performed using the A5 size print medium 70, the surface temperature can be controlled more accurately in the NCD mode than in the CD mode. Further, a temperature decrease of about 7° C. in the NCD mode dose not cause significant deterioration in fixing performance.

As described above, the first embodiment prevents decreases in the surface temperature of the heat roller 1 when continuous printing is performed on a plurality of pages of a print medium whose width is smaller than that of the print medium of the maximum acceptable size.

The fixing results of a heat roller can be evaluated in terms of adhesion of toner to the print medium. The adhesion is evaluated as follows:

1. Measure the print density (D1) of a solidly printed medium.

2. Place an adhesive tape on an area of the solidly printed medium such that the weight of the adhesive tape presses down the toner. Then, place a 100 mg/cm$^2$ cylindrical weight on the adhesive tape.

3. Remove the weight and then peel off the adhesive tape.

4. Measure the print density (D2) of the area from where the adhesive tape was peeled off and compare the print density D2 with D1.

5. Calculate (D2/D1)×>100%, which is the adhesion of the toner.

The adhesion of toner is determined by an amount of heat supplied from the heat roller 1 to the print medium 70 or 80. When the print medium 70 or 80 passes through the fixing unit 300 at a paper constant speed, the adhesion can be determined only in terms of the surface temperature of the heat roller 1. Adhesion of toner higher than 90% is sufficient.

Figure 6:
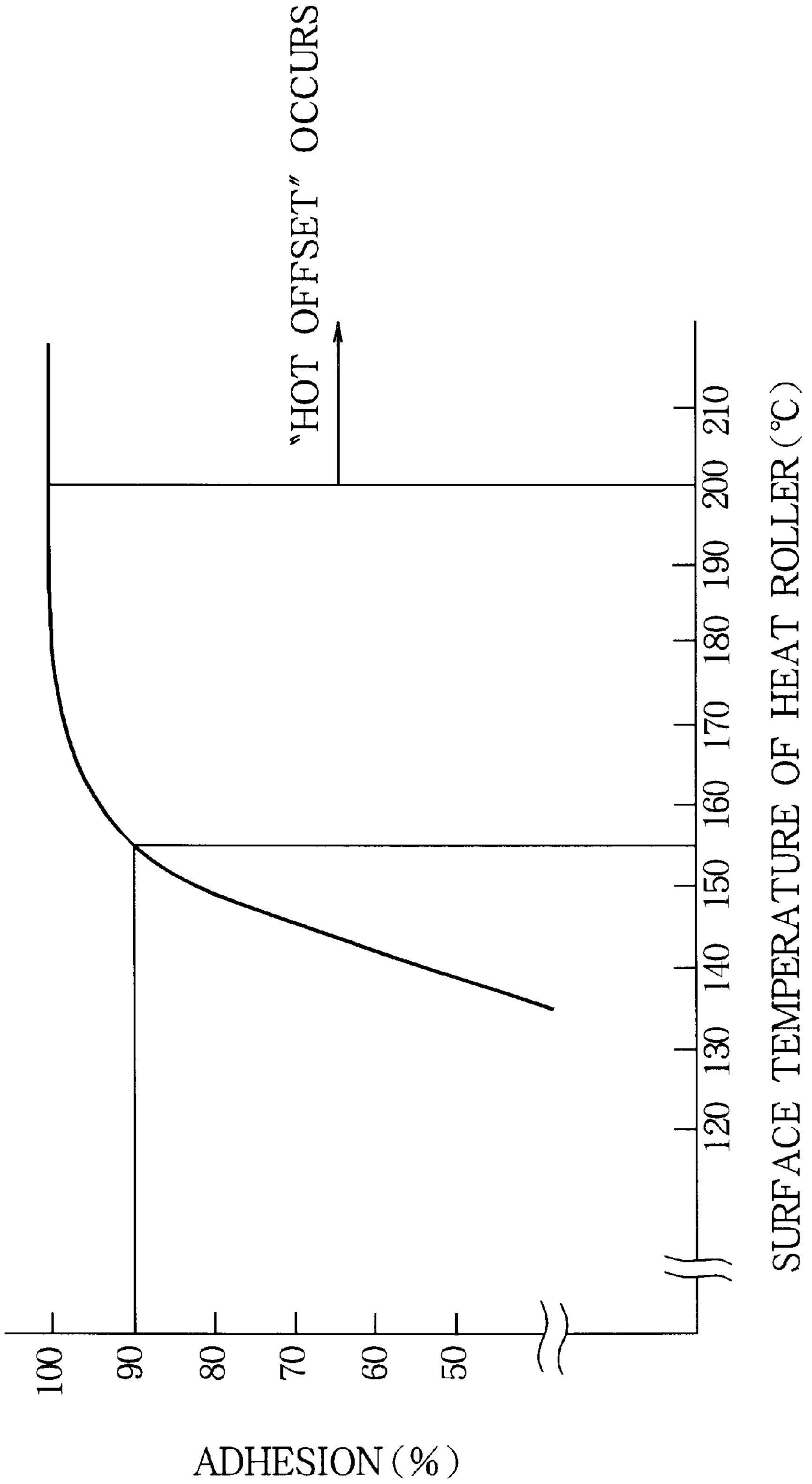
FIG. 6 illustrates the relationship between the adhesion of toner and the surface temperature of heat roller 1 when the print medium is transported at a paper speed of 2 in./sec and the target value of surface temperature is 170° C.

FIG. 6 illustrates the relationship between the adhesion of toner and the surface temperature of heat roller 1 when the print medium 70 or 80 is transported at a paper speed of 2 in./sec and the target value of surface temperature is 170° C. It is to be noted that surface temperatures of the heat roller 1 below 155° C. causes the adhesion of toner to become less than 90%, leading to poor fixing results. Such poor fixing results can be overcome by controlling the surface temperature of the heat roller 1 in the NCD mode.

Second Embodiment

In order to switch between the CD mode and the NCD mode, the first embodiment requires the paper-size detectors 50 and 60 to detect the width of the supplied print medium, or the user to input information on the width of the print medium through the input section 18*b*. Providing the paper-size detector increases the overall manufacturing cost. Inputting information on paper size makes the overall key operation more complex and creates a chance of inputting erroneous information. A second embodiment is to overcome this drawback and is characterized in that temperature $T_M$, is used to automatically switch between the CD mode and the NCD mode.

The construction of the second embodiment is substantially the same as that shown in FIG. 1. The second embodiment differs from the first embodiment in that the paper size detectors 50 and 60 are not provided and a different control program is used for switching between the CD mode and the NCD mode. The warm-up operation in the second embodiment is the same as that of the first embodiment.

Figure 7:
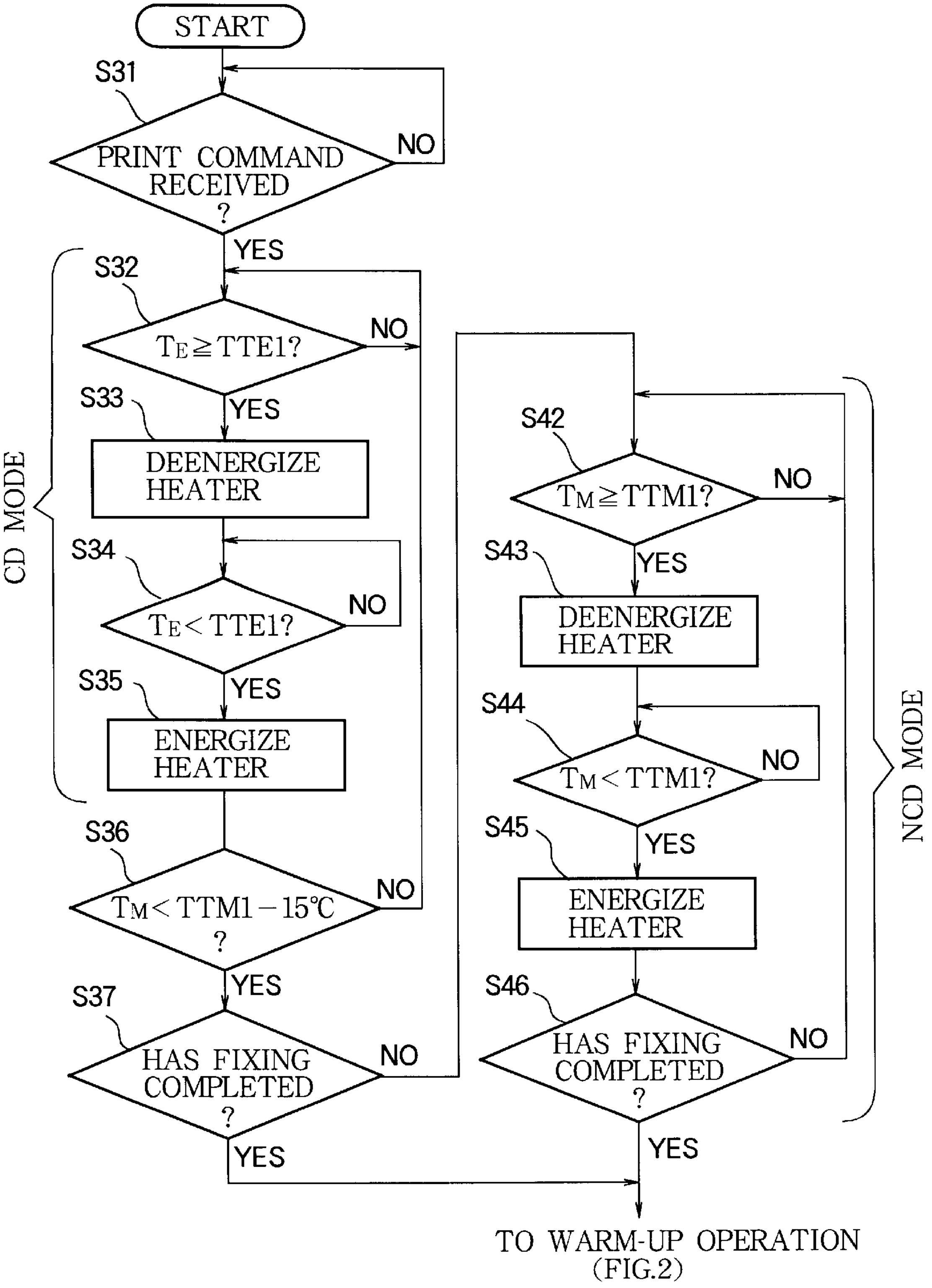
FIG. 7 is a flowchart illustrating a temperature control of the heat roller 1 according to the second embodiment.

FIG. 7 is a flowchart illustrating a temperature control of the heat roller 1 according to the second embodiment. This operation is performed instead of the operation described with reference to FIG. 3.

Step S31 is the same as step S11 of FIG. 3. The operation performed at steps S32–S35 is an operation in the NCD mode and the same as that performed at steps S13–S16. The operation performed at steps S42–S45 is an operation in the NCD mode and the same as that performed at steps S23–S26. Thus, their description is omitted for simplicity.

The second embodiment differs from the first embodiment in that step S12 is replaced by step S36. At step S12, the size of print medium is checked to determine whether the temperature control should be performed in the CD mode or in the NCD mode. At step S36, the temperature $T_M$ is checked to determine whether the temperature controlled should be performed in the CD mode or in the NCD mode.

A decision is made at step S36 to determine whether if $T_M$<TTM1−15° C. If the answer is NO at step S36, then the program jumps back to step S32. If the answer is YES at step S36, then the program proceeds to step S37 where a decision is made to determine whether the fixing operation has been completed. If the answer is YES at step S37, then the program returns to the warm-up operation of FIG. 2. If the answer is NO at step S37, then the program proceeds to step S42 where the temperature control mode is switched from the CD mode to the NCD mode.

At step S46, a decision is made to determine whether the fixing operation has been completed. If the answer is YES at step S46, then the program jumps back to the warm-up operation of FIG. 2. If the answer is NO at step S46, the program loops back to step S42 for repeating the temperature control in the NCD mode.

Figure 8:
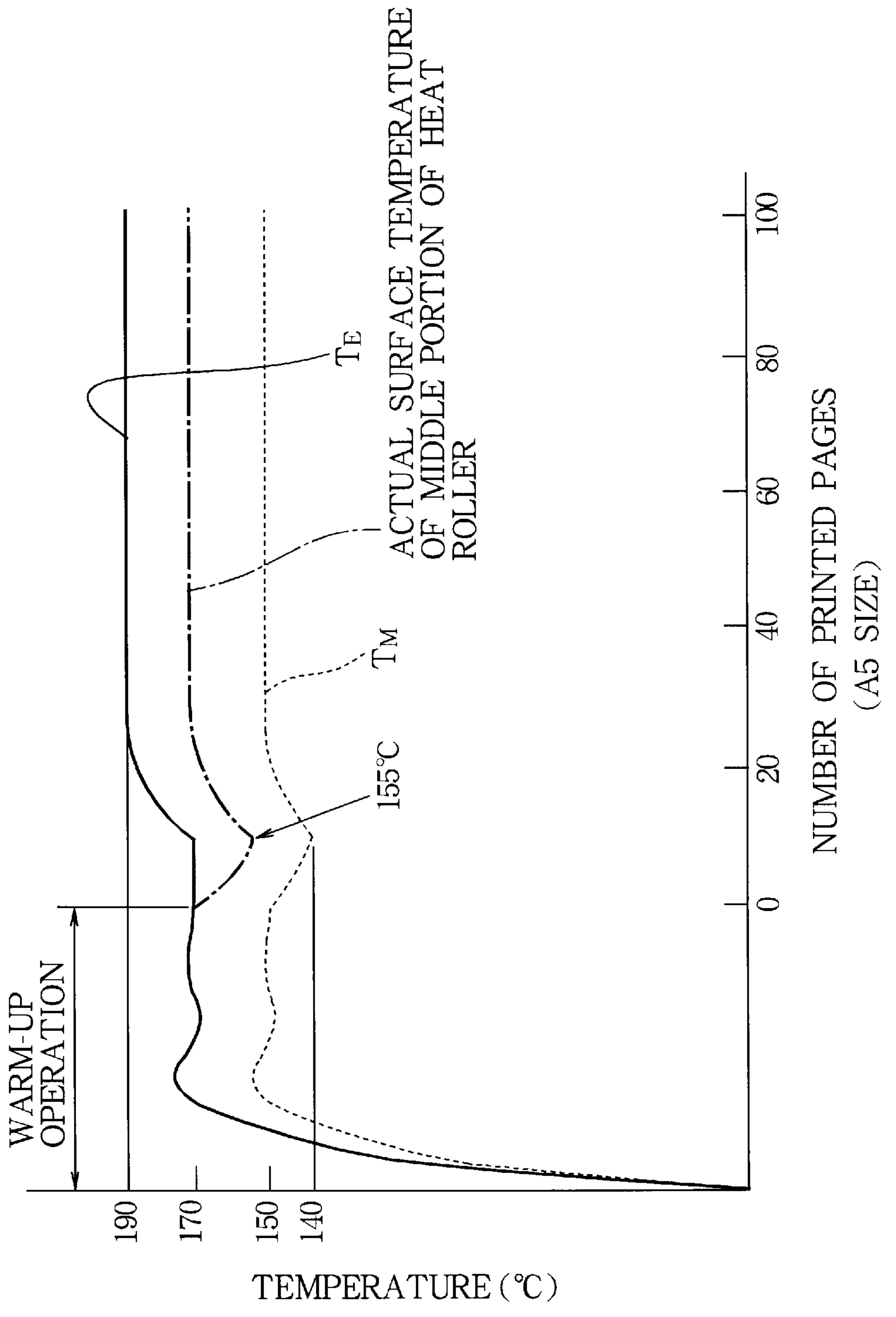
FIG. 8 shows the relationship between the temperature $T_M$ of the longitudinal middle portion of the heat roller and the number of printed pages when continuous printing is performed on the A5 size paper.

It is to be noted that at step S36, $T_M$ is used to switch between the CD mode and the NCD mode. In other words, paper size is determined whether it is A5 or A4, for example. If $T_M$<TTM1−15° C., then it is determined that the print medium is A5 size paper and the temperature control is switched from the CD mode to the NCD mode. The operation at step S36 uses the phenomenon that in the CD mode, the surface temperature of the heat roller 1 becomes lower at the middle potion of the roller than at the end portion if printing is performed on a narrow-width print medium such as A5 size paper. FIG. 8 shows the relationship between the temperature $T_M$ of the longitudinal middle portion of the heat roller and the number of printed pages when continuous printing is performed on the A5 size paper.

Referring to FIG. 8, for the reasons mentioned above, the temperature $T_M$ in the longitudinally middle portion of the heat roller 1 gradually decreases when the temperature is being controlled in the CD mode after the warm-up operation. When $T_M$ reaches a lower limit, i.e., 140° C., the temperature control is switched from the CD mode to the NCD mode where the heater 2 is energized such that the surface temperature stays at an equilibrium temperature of about 170° C. Thus, in the second embodiment, too, good fixing results are obtained when continuous printing is performed on a plurality of pages of A5 size paper.

Third Embodiment

Referring to FIG. 8, when the temperature in the longitudinally middle portion of the heat roller 1 reaches an equilibrium at 170° C., the temperature $T_E$ at the point E of the heat roller 1 has increased to 190° C. In the second embodiment, when the temperature of the point E exceeds 200° C., a phenomenon referred to as "hot offset" occurs. "Hot offset" is a phenomenon in which melted toner loses its viscosity to be deposited on the heat roller and adheres to an unwanted area of the print medium. As is clear from FIG. 8, $T_M$ increases only up to 190° C., which is not high enough for "hot offset" to occur. However, recent demands for high speed printing requires high speed transportation of the print medium in the image forming apparatus. This in turn requires higher values of various target temperatures.

For example, in the first and second embodiments, if the transportation speed of the print medium is increased from 2 in./sec to 4 in./sec, then the target temperature of the contact type temperature detector 30 should be increased to 200° C. This high temperature (i.e., 200° C.) causes "hot offset". Thus, toner should be improved in order to avoid "hot offset". However, improvement to the toner may not be a sufficient solution to "hot offset" because high temperatures cause deformation of peripheral parts, evaporation of oil at the bearings of the heat roller 1, and the wearing away of bearings. Therefore, the temperature $T_E$ should not exceed a highest temperature of 230° C. even if improved toner is used.

A third embodiment is characterized in that the $T_E$ is used to prevent "hot offset" from occurring when the transportation speed of print medium is increased to 4 in./sec.

In the third embodiment, the print medium is transported at a speed of 4 in./sec, the target temperature of the heat roller 1 is 200° C., and a maximum acceptable width of the print medium in portrait orientation is 8.5 in. (letter size). The control block of the third embodiment is similar to that of FIG. 1 except that the paper-size detectors 50 and 60 are not provided and a different control program is used to switch between the CD mode and the NCD mode. The warm-up operation of the third embodiment is the same as that of FIG. 2.

Figure 9:
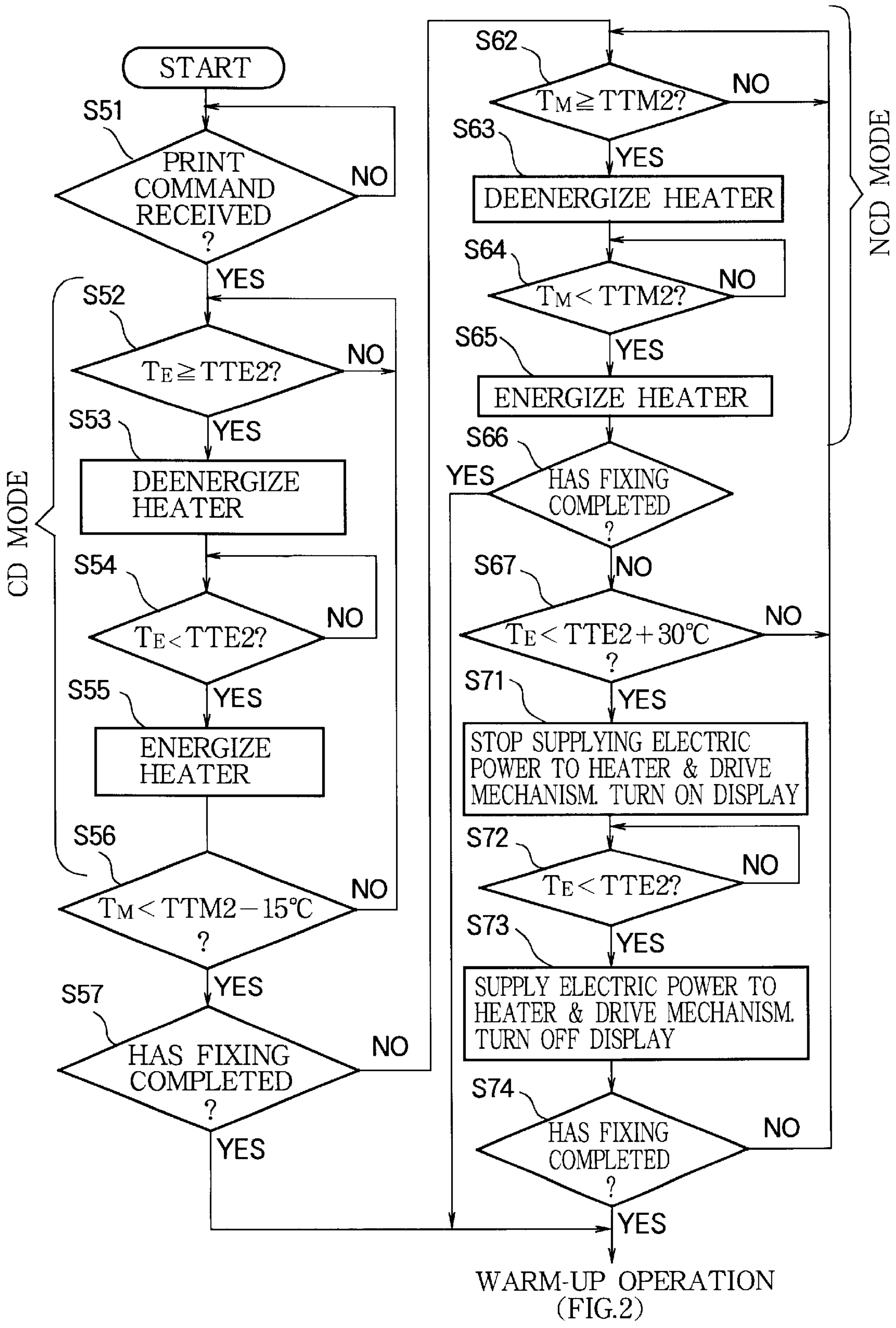
FIG. 9 is a flowchart illustrating the temperature control operation according to the third embodiment.

FIG. 9 is a flowchart illustrating the temperature control operation according to the third embodiment. This operation is performed in stead of the operation described with reference to FIG. 3 or the operation described with reference to FIG. 7.

The control performed by steps S51–S65 is the same as that performed by steps S31–S45 in the second embodiment, and therefore the description thereof is omitted.

The third embodiment differs from the second embodiment in that an operation performed by steps S66–S74 is added to the second embodiment. In other words, when $T_E$≧TTE2+30° C. (TTE2 is, for example, 200° C., and TTE2+30° C. is a highest allowable temperature), the supply of electric power to the fixing unit 300 and paper transporting devices is interrupted and the display section 18*a* shows a warning to indicate to the user that image-forming operation cannot be carried out. When $T_E$<TTE2+30° C., the supply of electric power is resumed and the warning is canceled.

At step S66, a decision is made to determine whether the fixing operation has been completed. If the answer is YES at step S66, then the program jumps back to the warm-up operation of FIG. 2. If the answer is NO at step S66, then the program proceeds to step S67 where a decision is made to determine whether $T_E$≧TTE2+30° C. If the answer is YES at step S67, the program proceeds to step S71. If the answer is NO at step S67, the program loops back to step S62 for controlling the temperature of the heat roller 1 in the NCD mode.

At step S71, the main controller 11 stops supplying electric power to the fixing unit 300 and the drive source of the medium transporting mechanism, and causes the display section 18*a* to display a warning indicating to the user that image-forming operation cannot be carried out.

At step S72, a decision is made to determine whether $T_E$<TTE2. If the answer is YES at step S72, then the program proceeds to step S73 where the main controller 11 resumes to supply electric power to the fixing unit 300 and the drive source of the medium transporting mechanism and causes the display section 18*a* not to display the warning. If the answer is NO at step S72, the program repeats step S72. At step S74, a decision is made to determine whether the fixing operation has been completed. If the answer is YES at step S74, then the program jumps to the warm-up operation of FIG. 2. If the answer is NO at step S74, then the program loops back to step S62.

Figure 10:
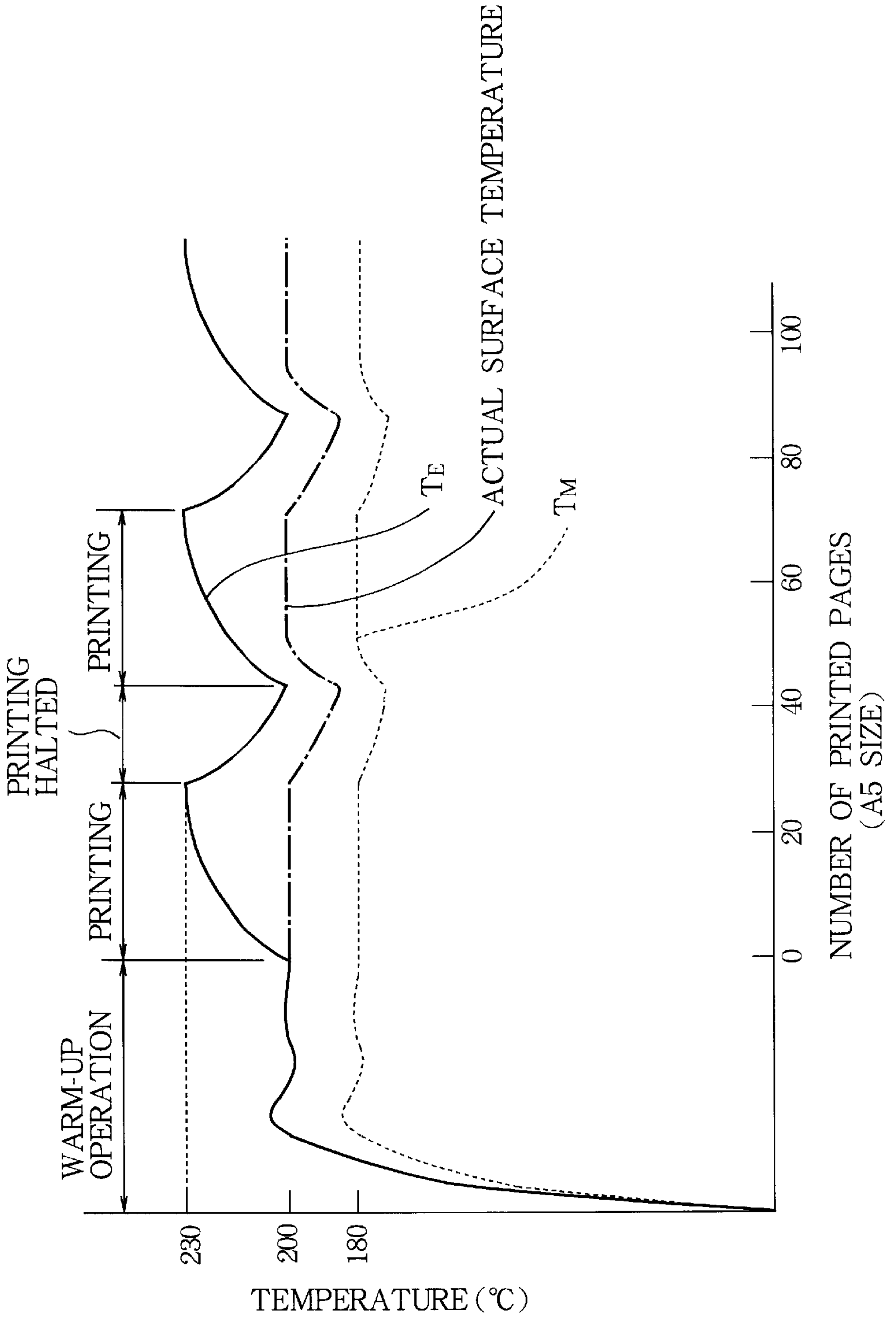
FIG. 10 shows the relationship between the temperatures of various parts of the heat roller 1 and the number of pages when continuous printing is performed on a plurality of pages of A5 size paper.

FIG. 10 shows the relationship between the temperatures of various parts of the heat roller 1 and the number of pages when continuous printing is performed on a plurality of pages of A5 size paper. It is to be noted that the temperature control in the NCD mode begins shortly after the warm-up operation.

Referring to FIG. 10, the surface temperature (dot-dash line curve) in the longitudinal middle of the heat roller 1 is maintained to 200° C. when the temperature is controlled in the NCD mode after the warm-up operation, but the temperature $T_E$ increases gradually as the number of continuously printed pages increases. When $T_E$ (solid line curve) reaches a maximum value (highest allowable temperature of about 230° C.), the main controller 11 stops supplying electric power to the fixing unit 300 and the drive source of the medium transporting mechanism. Thus, thereafter if printing is not performed, $T_E$ gradually decreases because the heat roller 1 loses heat to the surroundings. When $T_E$ has decreased to the target temperature 200° C., the main controller 11 resumes to supply electric power to the fixing unit 300 and the drive source of the medium transporting mechanism, so that $T_E$ gradually increases as printing is performed continuously on a plurality of pages thereafter. The aforementioned operation is repeated in the third embodiment so that good fixing results can be obtained reliably when continuous printing is performed on a plurality of pages of A5 size print medium 70.

Fourth Embodiment

In the third embodiment, when the main controller 11 stops supplying electric power to the fixing unit 300 and the surroundings and waits until the temperature decreases due to natural heat dissipation to the surroundings. Thus, if a large number of pages are to be printed, the apparatus halts printing many times so that an overall printing time increases.

A fourth embodiment is characterized in that when a print medium is transported at a speed of 4 in./sec, $T_E$ is used to prevent "hot offsets" while still maintaining the same printing time. The control block diagram of the fourth embodiment differs from that of FIG. 1 in that the paper-size detectors 50 and 60 are not provided and a different control program is used to switch between the CD mode and the NCD mode. The warm-up operation of the fourth embodiment is the same as that of FIG. 2.

Figure 11:
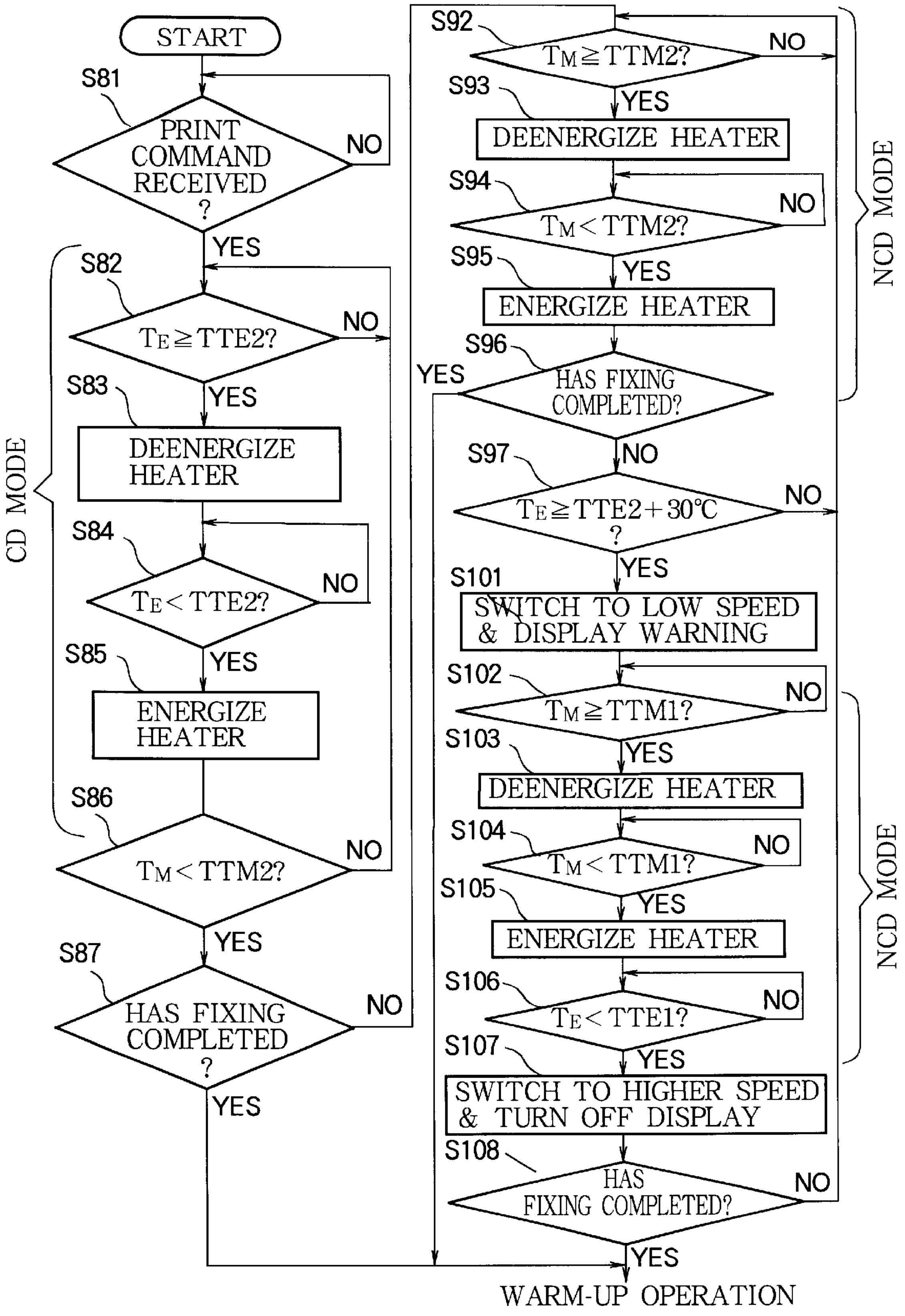
FIG. 11 is a flowchart illustrating the temperature control of t he fixing unit according to the fourth embodiment.

FIG. 11 is a flowchart illustrating the temperature control of t he fixing unit according to the fourth embodiment.

This temperature control is performed in stead of the temperature control in the second embodiment described with reference to FIG. 7 or the temperature control in the third embodiment described with reference to FIG. 9.

The control performed by steps S81–S97 is the same as that performed by steps S51–S67 in the third embodiment, and the control performed by steps S102–S105 is the same as that performed by steps S23–S26 in the first embodiment. Therefore, the description thereof is omitted.

The fourth embodiment differs from the third embodiment in that the temperature control performed by steps S101–S108 is added. In other words, when $T_E$ exceeds a maximum allowable temperature TTE2+30° C., the print medium is transported at a lower speed and the main controller 11 causes the display section 18*a* to display a warning that image-forming speed will be decreased, and when $T_E$<TTE1, the print medium is transported at a higher speed and the main controller 11 causes the display section 18*a* not to display the warning.

If $T_E \geqq$TTE2+30° C. at step S97 (e.g., TTE2=200° C.), then the program proceeds to step S101.

At step S101 the following operations are performed. The transportation speed of the print medium is switched from 4 in./sec to 2 in./sec. The target temperature of the contact type temperature detector 30 is switched from TTE2 to TTE1 (i.e., 170° C.). The target temperature of the non-contact type temperature detector 40 is switched from TTM2 (e.g., 180° C.) to TTM1 (i.e., 155° C.). The main controller causes the display section 18*a* to display a warning that the image forming speed will be decreased.

At step S106, a decision is made to determine whether $T_M$<TTE1. If the answer is NO at step S106, then the program returns to step S102. If the answer is YES at step S106, then the program proceeds to step S107.

At step S107, the following operations are performed. The transportation speed is increased from 2 in./sec to 4 in./sec. The target temperature of the contact type temperature detector 30 is switched from TTE1 (e.g., 170° C.) to TTE2 (e.g., 200° C.). The target temperature of the non-contact type temperature detector 40 is switched from TTM1 (e.g., 155° C.) to TTM2 (e.g., 180° C.). The main controller 11 causes the display section 18*a* not to display a warning that the image forming speed will be decreased.

At step S108, a decision is made to determine whether the fixing operation has been completed. If the answer is YES at step S108, the program jumps to the warm-up operation of FIG. 2. If the answer is NO at step S108, then the program loops back to step S92 where temperature control is performed in the NCD mode for a paper speed of 4 in./sec.

A printing operation according to the fourth embodiment was carried out continuously on 100 pages of A5 size print medium 70, and the printing operation was completed in seven minutes. The same printing operation was completed in ten minutes in the third embodiment. Thus, the fourth embodiment improves the printing time of the third embodiment by three minutes.

In the fourth embodiment, $T_E$ is used to control the temperature of the heat roller 1 in such a way that when the transportation speed of the A5 size print medium is increased to 4 in./sec, the temperature $T_E$ at the point E will not increase to cause "hot offset". Moreover, the fourth embodiment provides as short a printing time as possible when a large number of pages are printed.

In the fourth embodiment, two different transportation speeds of the print medium are required, so that the size of the control program may be large and a large memory area may be required. Therefore, either the third embodiment or the fourth embodiment may be selectively employed depending on whether cost is of prime importance or speed is of prime importance.

The present embodiment has been described with respect to a case where a maximum size of print medium is A4 size in portrait orientation and a smaller size of print medium is A5 size in portrait orientation. The size of print medium is not limited to these particular sizes and a print medium having an arbitrary size such as a letter size instead of A4 size may be employed. The target temperatures and limit temperatures are not limited to TTE1=155° C., TTE1=170° C., TTM2=180° C., TTE2=200° C., TTE+30=230° C., and the lower limit=140° C., but other temperatures may be employed.

Fifth Embodiment

A fifth embodiment is directed to a correction of the surface temperature of the heat roller 1 detected by the non-contact type temperature detector 40, and a temperature control based on the corrected surface temperature.

In the fifth embodiment, a temperature $T_M$ disposed in the longitudinally middle portion (i.e., point M) of the heat roller 1, is corrected to obtain a corrected temperature $T_C$, which is accurately close to an actual surface temperature $T_S$ at the middle portion of a longitudinally extending heat roller. The correction value is determined at the end of the warm-up operation carried out immediately after power up of the fixing unit, so that the corrected temperature $T_C$ can be obtained based on the temperature $T_M$ during a printing operation.

Figure 12:
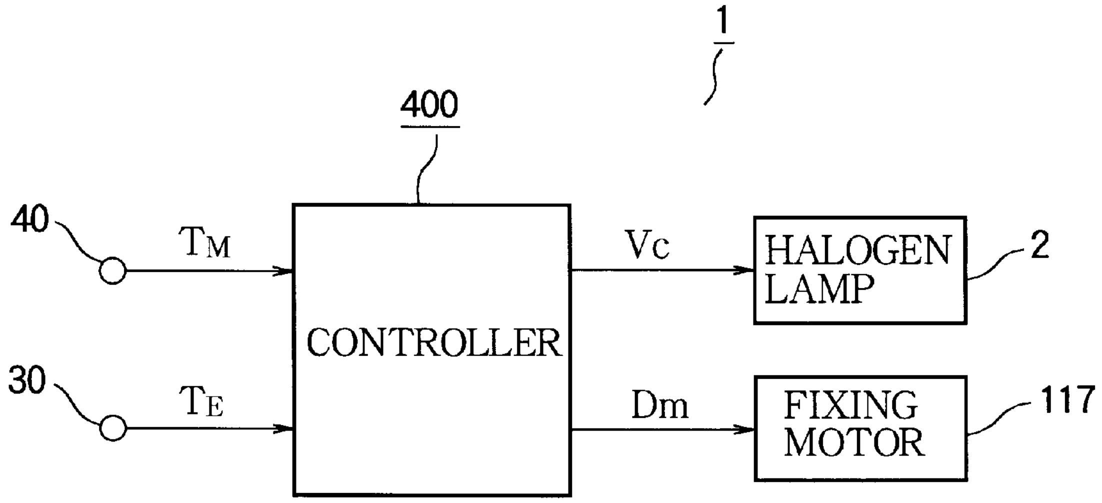
FIG. 12 is a block diagram illustrating a method of correcting the surface temperature of the heat roller and a control system that uses the method.

FIG. 12 is a block diagram illustrating a method of correcting the surface temperature of the heat roller and a control system that uses the method.

Referring to FIG. 12, a control system 1 calculates an actual surface temperature of a heat roller 1 of a fixing unit 101 of FIG. 1. The control system 1 also controls the on-off operation of a heater 2 in the form of a halogen lamp.

The controller 2 receives a temperature $T_M$ at a point M (FIG. 1) detected by a non-contact type temperature detector 40 and a temperature $T_E$ at the point E detected by a contact type temperature detector 30. The controller 2 then calculates the corrected temperature $T_C$ using a later described procedure. The controller 2 outputs a switching signal Vc that causes the heater 2 to turn on and off and a drive signal Dm that causes a fixing motor 117 to drive the heat roller 1 in rotation.

Figure 13:
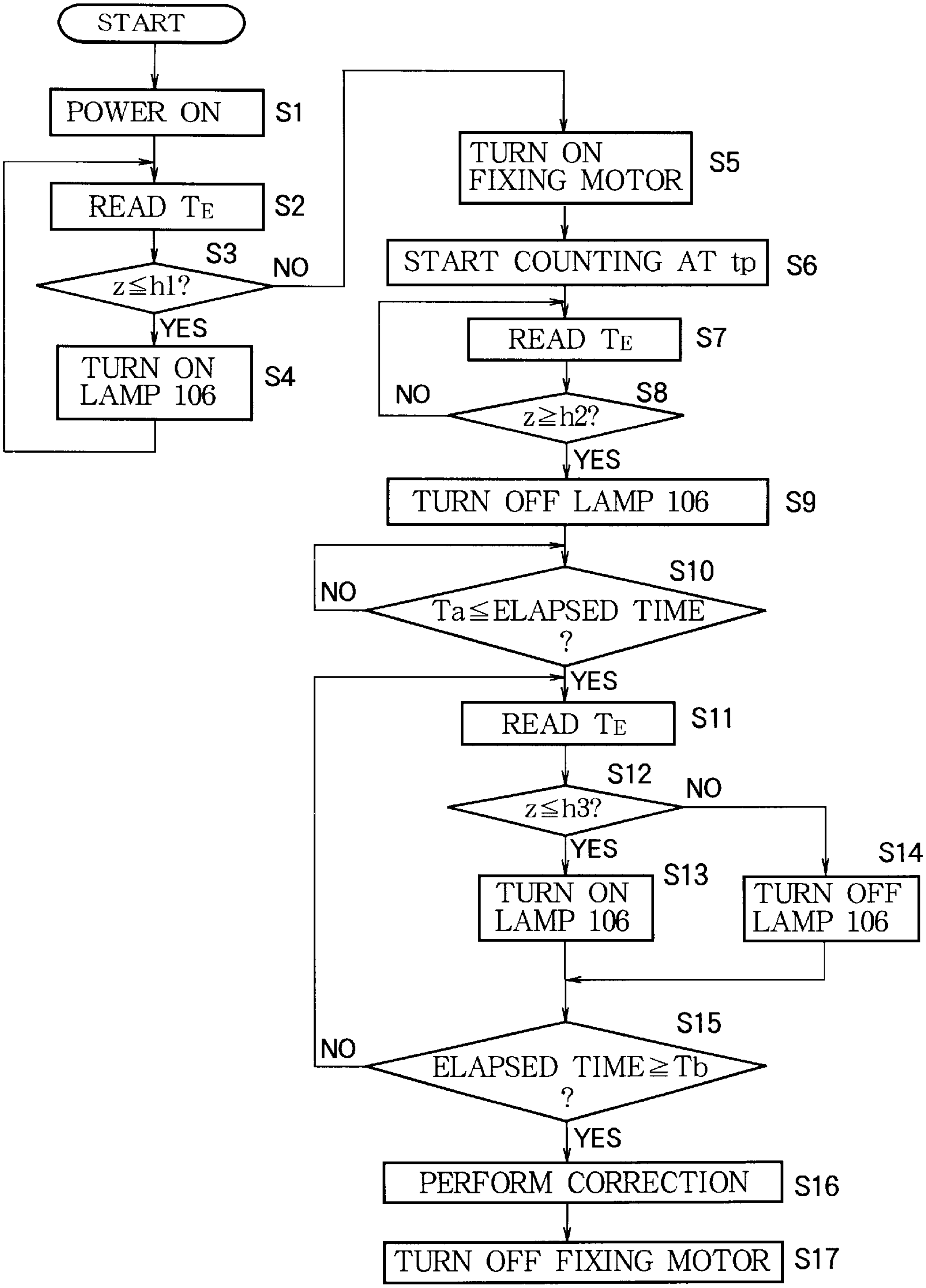
FIG. 13 is a flowchart illustrating a correction method according to the fifth embodiment, the correction method being carried out by the controller of the control system 1 of FIG. 12.

FIG. 13 is a flowchart illustrating a correction method according to the fifth embodiment, the correction method being carried out by the controller 400 of the control system 1 of FIG. 12.

Figure 14:
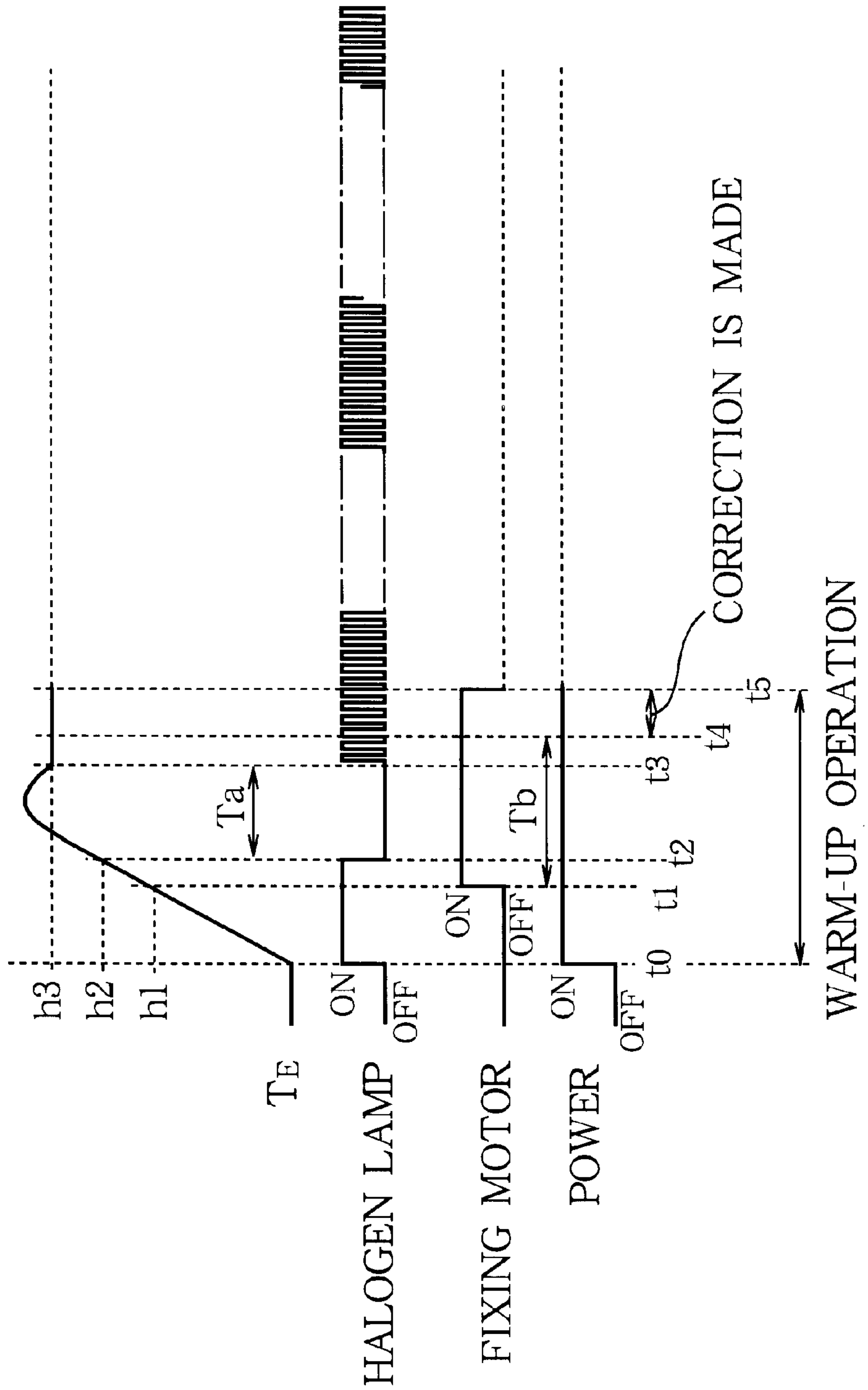
FIG. 14 is a timing chart illustrating the operations of various parts of the control system 1 when the control system 1 operates according to the flowchart of FIG. 13.

FIG. 14 is a timing chart illustrating the operations of various parts of the control system 1 when the control system 1 operates according to the flowchart of FIG. 13

{Warm-up Operation}

The flowchart of FIG. 13 will be described with reference to FIG. 14.

At step S1, the fixing unit 101 is turned on and the motor 117 is turned on. At step S2, the contact type temperature detector 30 detects a surface temperature $T_E$ of the heat roller 1 (FIG. 1). At step S3, a decision is made to determine whether the temperature $T_E \leqq h1$. If the answer is YES at step S3, then the program proceeds to step S4 where the heater 2 is turned on, and then jumps back to step S2. The heater 2 is turned on at time t0 of FIG. 14. Steps S2–S4 are repeated until the answer is NO at step S103.

If the answer is NO at step S3, it is assumed that the temperature $T_E$ exceeds h1 at time t1 of FIG. 14 and the program proceeds to steps S5–S6 where the fixing motor 117 is turned on and the controller 2 starts to count an elapsed time. Then, at step S7, the controller 2 reads the temperature $T_E$ at the point E. At step S8, a decision is made to determine whether $T_E \geqq h2$. If the answer is No at step S8, the program returns to step S7 to repeat steps S7–S8 until $T_E \geqq h2$.

If the answer is YES at step S8, the program proceeds to step S9 where the heater 2 is turned off. At step S10, the program waits until elapsed time reaches or exceeds Ta. The temperature of the heat roller 1 continues to increase for a certain period of time after the halogen lamp 2 is turned off. The temperature $T_E$ passes h2 at time t2, then h3 and finally decreases to h3 at time t3. The temperature h3 is a fixing temperature. The time period Ta is a period from time t2 to time t3 and is a time elapse from turn-off of the heater 2 at step S9 until the temperature of the heat roller falls to the temperature3. The length of Ta is determined by experiment.

At step S11, the controller 2 reads the temperature $T_E$ again. At step S12, a decision is made to determine whether $T_E \leqq h3$. If the answer is YES at step S12, the heater 2 is turned on at step S13; if NO, the heater 2 is turned off at step 14. At step S15, a decision is made to determine whether elapsed time reached or exceeds Tb. If YES at step S15, then the later described correction of detected temperature $T_M$ is performed at step S16. Then, at step S17, the fixing motor 117 is turned off, thereby completing the warm-up operation.

Steps S11–S15 correspond to time t3 of FIG. 14 and steps S16 corresponds to time t4 to time t5. The correction of temperature begins at time t4 and the control loop S11–S15 maintains the temperature $T_E$ at the fixing temperature h3.

{Correction of Temperature}

The correction of temperature performed at step S16 will now be described with reference to FIGS. 14 and 15.

Figure 15:
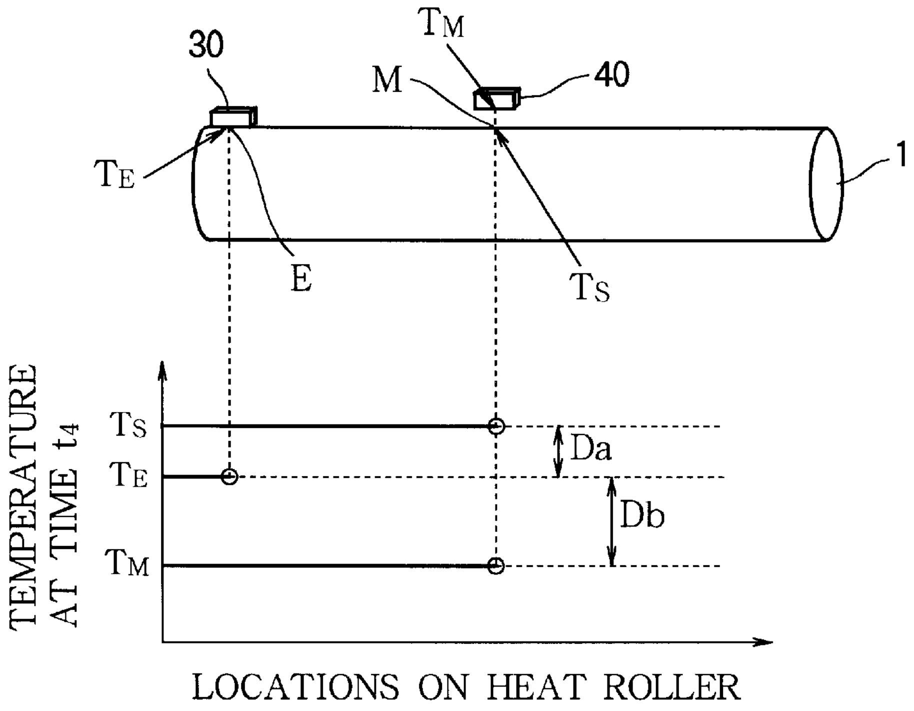
FIG. 15 illustrates temperatures at various points on the heat roller 1 along the length of the heat roller 1 when the correction of temperature begins at time t4 during the warm-up operation.

FIG. 15 illustrates temperatures at various points on the heat roller 1 along the length of the heat roller 1 when the correction of temperature begins at time t4 during the warm-up operation.

When the warm-up operation starts from a cold start, i.e., the printer is turned on when the temperature inside the printer is the same as room temperature, the surface temperatures of the heat roller 1 reaches equilibrium at time t4.

The rod-like heater 2 generates more heat at the middle thereof than at end portions thereof and the heat roller 1 dissipates heat at end portions thereof than at the middle portion thereof. Thus, at time t4 at which the heat roller has not lost heat to the print medium yet, the temperature at the longitudinal middle portion of the heat roller 1 is stable and several degrees to several tens degrees Celsius higher than that at the longitudinal end portions.

Da is a temperature difference between an actual surface temperature TSat the middle of the heat roller 106 at time t4 and a temperature $T_E$ at portion E of the heat roller 1 at time t4. Therefore, $Da=T_S-T_E$. Da is experimentally determined.

Db is a temperature difference between a temperature $T_E$ at an end portion (i.e., point E) of the heat roller and a temperature $T_M$ at the middle portion (i.e., point M) of the heat roller 1 detected by the non-contact type temperature detector 40. Therefore, $Db=T_E-T_M$. A difference between an actual surface temperature $T_S$ at the middle of the heat roller 1 and a temperature $T_M$, i.e., a temperature correction value $T_S-T_M$ can be obtained by using Da and Db. Thus, the correction $T_S-T_M$ is equal to Da+Db. The value of Da+Db is substantially constant not only at time t4 but also during the printing operation where the heat roller 1 is maintained at high temperature. Thus, reading temperature $T_M$ with the non-contact type temperature detector 40 allows calculation of corrected surface temperature $T_S=T_M+(Da+Db)$ which is an approximated actual temperature at the middle of the longitudinal heat roller 1.

Db is measured and set when the warm-up operation is performed. Thus, the correction operation accommodates the gap G (FIG. 1) between the non-contact type temperature detector 40 and the surface of the heat roller 1, which varies due to manufacturing errors. Thus, the correction operation is very advantageous.

When continuous fixing is performed on a plurality of pages, the temperature in the surface area 1*a* (i.e., point M) in contact with the print medium will decrease to a value lower than the temperature at the point as the number of printed pages increases. In such a case, a corrected temperature or actual surface temperature $T_C$ can be obtained by equation $T_C=T_M+(Da+Db)$.

Sixth Embodiment

The method described in the fifth embodiment suffer from the problem that ΔDa varies depending on the interior temperature of the printer before the printer is turned on. Therefore, a corrected temperature $T_C$ may not be close to an actual temperature. This problem occurs, for example, when the printer is turned on again relatively short time after the printer was turned off.

Figure 16:
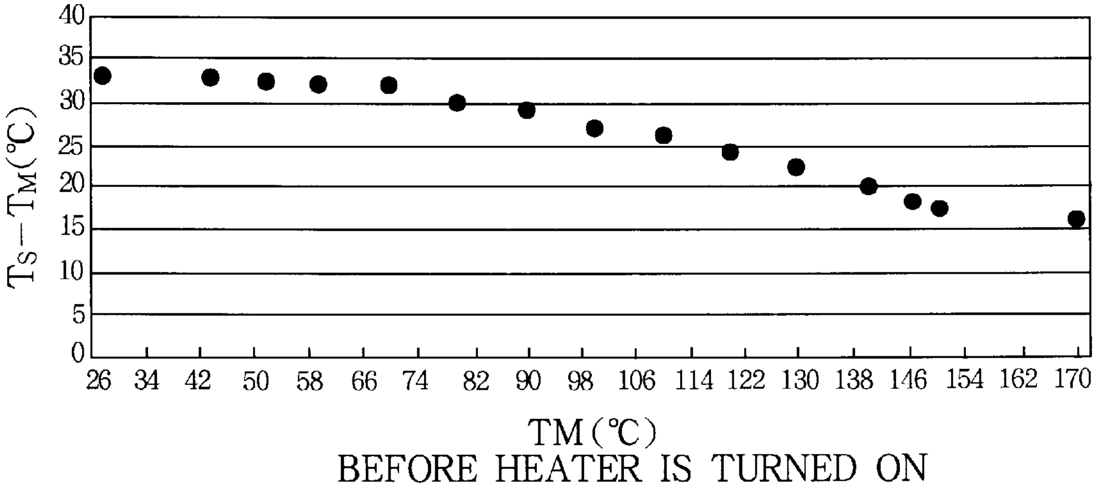
FIG. 16 illustrates the relationship between difference $T_S - T_M$ at time t4 of FIG. 14 and the surface temperature $T_M$ detected by the non-contact type temperature detector 40 immediately before time t0.

FIG. 16 illustrates the relationship between difference $T_S-T_M$ at time t4 of FIG. 14 and the surface temperature $T_M$ immediately before time t0.

As is clear form FIG. 16, if the warm-up operation is performed from a cold start where room temperature is 28° C., i.e., $T_M$=28° C., then $T_S-T_M$=33° C. at time t4.

If the warm-up operation is performed when $T_M$=100° C., then $T_S-T_M$=27° C. at time t4. In other words, the value of $T_S-T_M$ is 6° C. lower when $T_M$=100° C. than when $T_M$=28° C. This case occurs, for example, if the printer is turned off after a printing operation and then the printer is turned on again a little later.

The temperature profile along the length of the heater 2 is responsible for variations of $T_S-T_M$ at time t4 depending on initial conditions. Usually, the heater 2 generates more heat at a longitudinally middle portion thereof than at longitudinal end portions thereof. If the heater 2 is energized until the temperature $T_E$ at the point E reaches a predetermined value, then temperature profile at the point M overshoots. The overshoot of temperature profile at the point M is larger when the initial surface temperature of the heat roller 1 is close to room temperature than when the initial surface temperature of heat roller 1 is relatively higher than room temperature. Thus, the temperature at the point M is high when the initial surface temperature of the heat roller 1 is close to room temperature.

In order to minimize the overshoot, the heat roller 1 and the pressure roller 107 are rotated so that the heat corresponding to the overshoot is transferred to the pressure roller 107.

As shown in FIG. 16, the lower the temperature of the heat roller 1 prior to the warm-up operation is, the larger the overshoot is. Thus, in the sixth embodiment, the heat roller 1 is energized for different lengths of time depending on the surface temperature $T_M$ prior to the warm-up operation, thereby effectively minimizing the overshoot. Then, the correction described in the fifth embodiment is performed.

In the sixth embodiment, thereby reducing adverse effects of the overshoot in temperature of the surface area 1*a* of the heat roller 1 in contact with the print medium.

Figure 17:
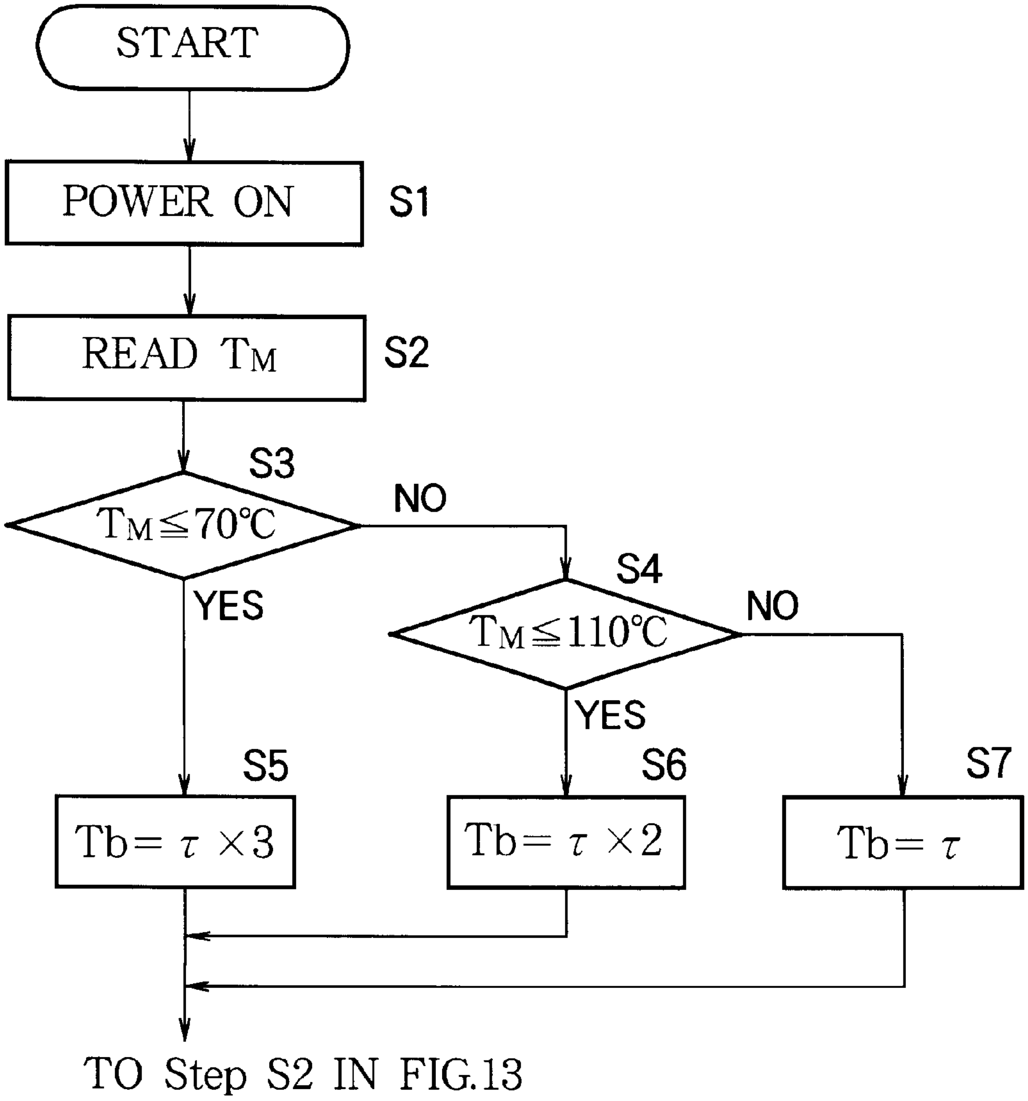
FIG. 17 is a flowchart illustrating a procedure of the sixth embodiment of a correction method, the procedure being carried out by the controller of the control system 1 of FIG. 12.

FIG. 17 is a flowchart illustrating a procedure of the sixth embodiment of a correction method, the procedure being carried out by the controller 2 of the control system 1 of FIG. 12.

Figure 18:
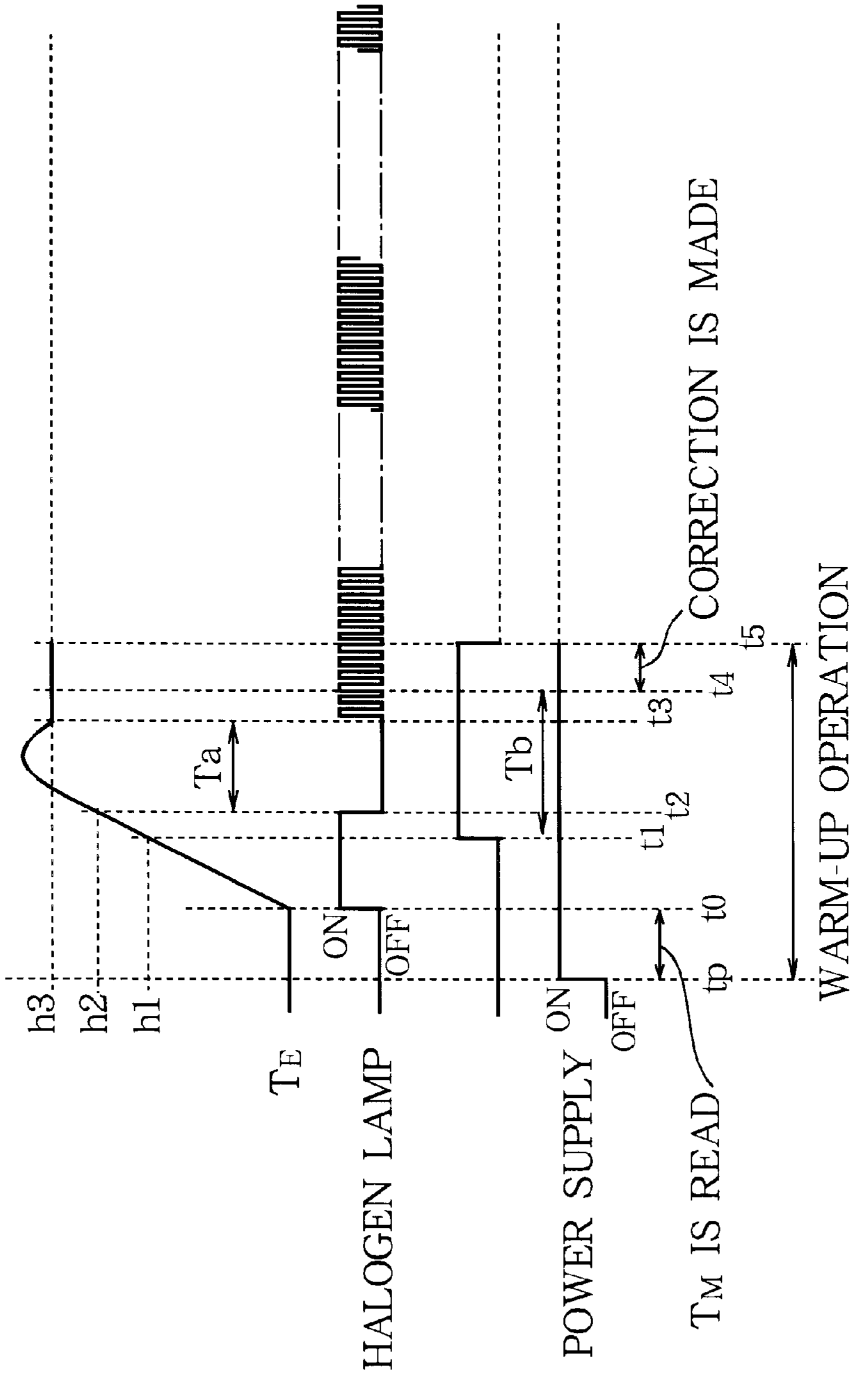
FIG. 18 is a timing chart illustrating the operations of various parts of the control system 1 when the control system 1 performs a warm-up operation according to the flowchart of FIG. 17.

FIG. 18 is a timing chart illustrating the operations of various parts of the control system 1 when the control system 1 performs a warm-up operation according to the flowchart of FIG. 17.

The flowchart of FIG. 17 will be described with reference to FIG. 18. Many of the steps in the flowchart of FIG. 17 are the same as those of FIG. 13. Thus, the common steps are indicated but the description thereof is omitted for simplicity.

At step S1, the fixing unit 101 is turned on at time tp. At step S2, the non-contact type temperature detector 40 (FIG. 1) detects a surface temperature $T_M$ of the heat roller 1. This surface temperature is $T_M$ at time tp in FIG. 18. At step S3, a decision is made to determine whether a temperature $T_M \leqq 70°$ C. or $T_M > 70°$ C. At step S4, a decision is made to determine whether $T_M \leqq 110°$ C. or $T_M > 110°$ C.

If $T_M \leqq -70°$ C. at step S3, then the main controller sets Tb to Tb=τ×3 (step S5) where τ is a predetermined value. If NO at step S3 and YES at step S4, (i.e., 70° C.<$T_M \leqq -110°$ C.), then the main controller sets Tb to Tb=τ×2 at step S6. If NO at step S4 (i.e., $T_M$>110° C.), then the main controller sets Tb to Tb=τ at step S7.

After steps S5–S7, the program continues to step S2 of the flowchart of FIG. 13.

Specifically, steps S2–S7 of FIG. 17 are carried out for a time period from time tp to time t0 of FIG. 18, thereby setting the value of Tb, which is a time period from time t1 to time t4 in FIG. 18. Tb is determined in accordance with the value of $T_M$ detected by the non-contact type temperature detector 30 at time tp.

During Tb, the heat roller 1 is rotated to minimize the overshoot in temperature at the longitudinal middle portion (point M) of the heat roller 1, so that the variation in $T_S-T_M$ due to the overshoot can be minimized before the temperature correction is carried out at time t4.

Since Tb is determined in accordance with the temperature of the longitudinal middle portion of the heat roller 1 before the heater 2 is turned on, the warm-up operation can be performed in a minimum time.

Seventh Embodiment

{Control of Temperature}

A method of controlling temperature in the continuous printing mode will be described. When the surface temperature in the area 1*a* becomes lower than the area 1*b*, the method is used to maintain the surface temperature of the area 1*a* (i.e., point M) of the heat roller through which the print medium passes to a predetermined fixing temperature.

Figure 19:
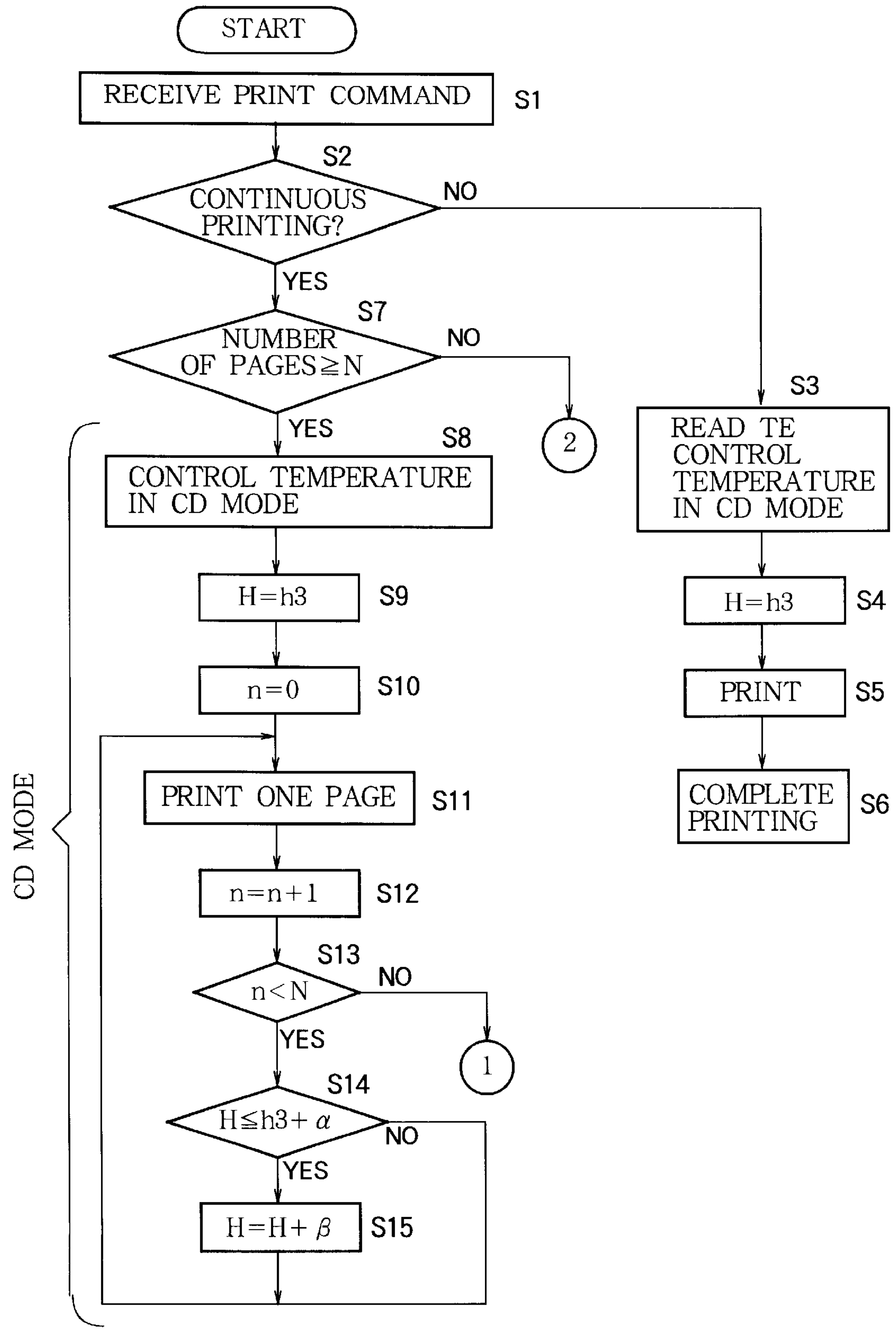
FIGS. 19–21 are flowcharts illustrating a procedure of the seventh embodiment.
Figure 20:
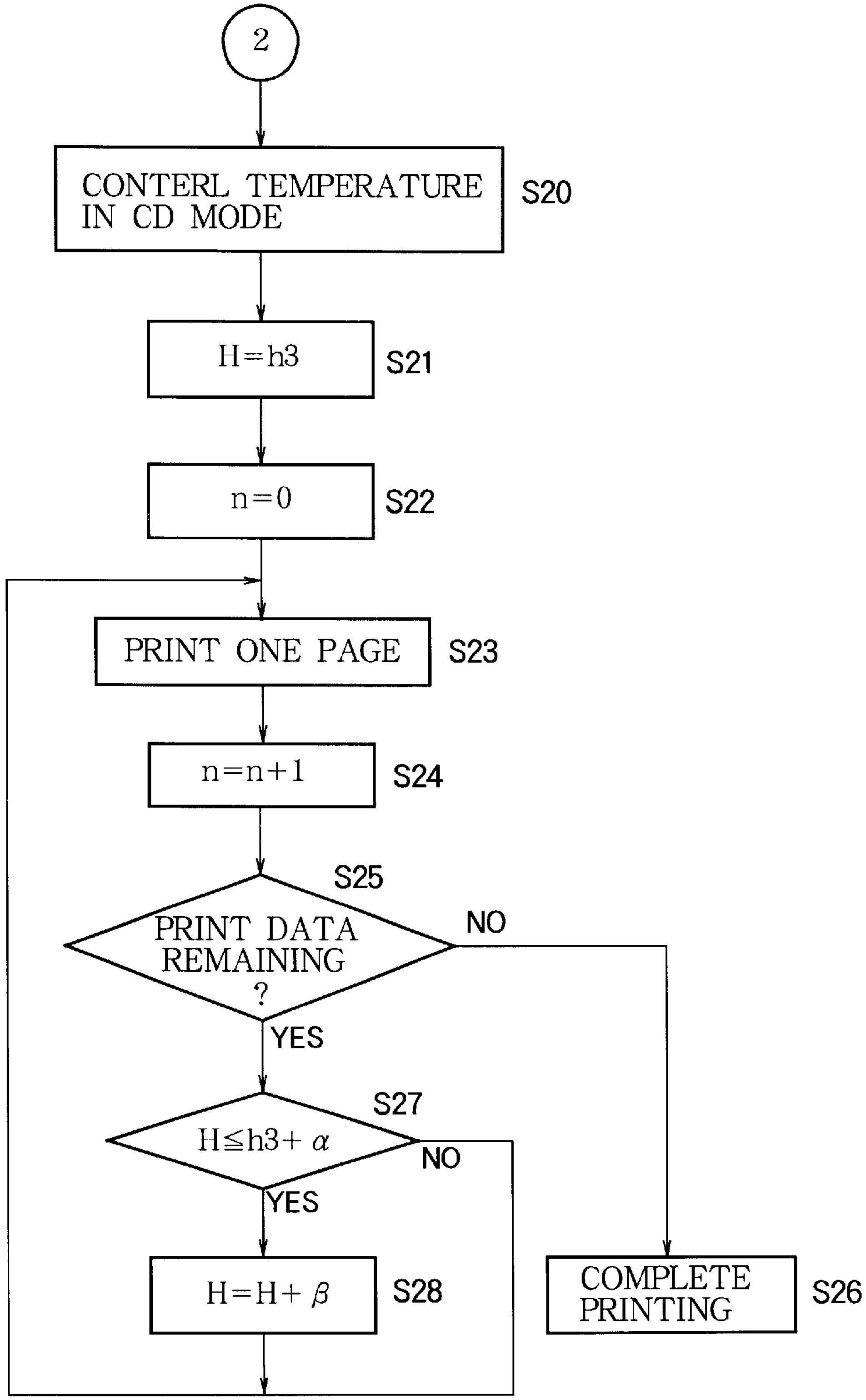
Figure 21:
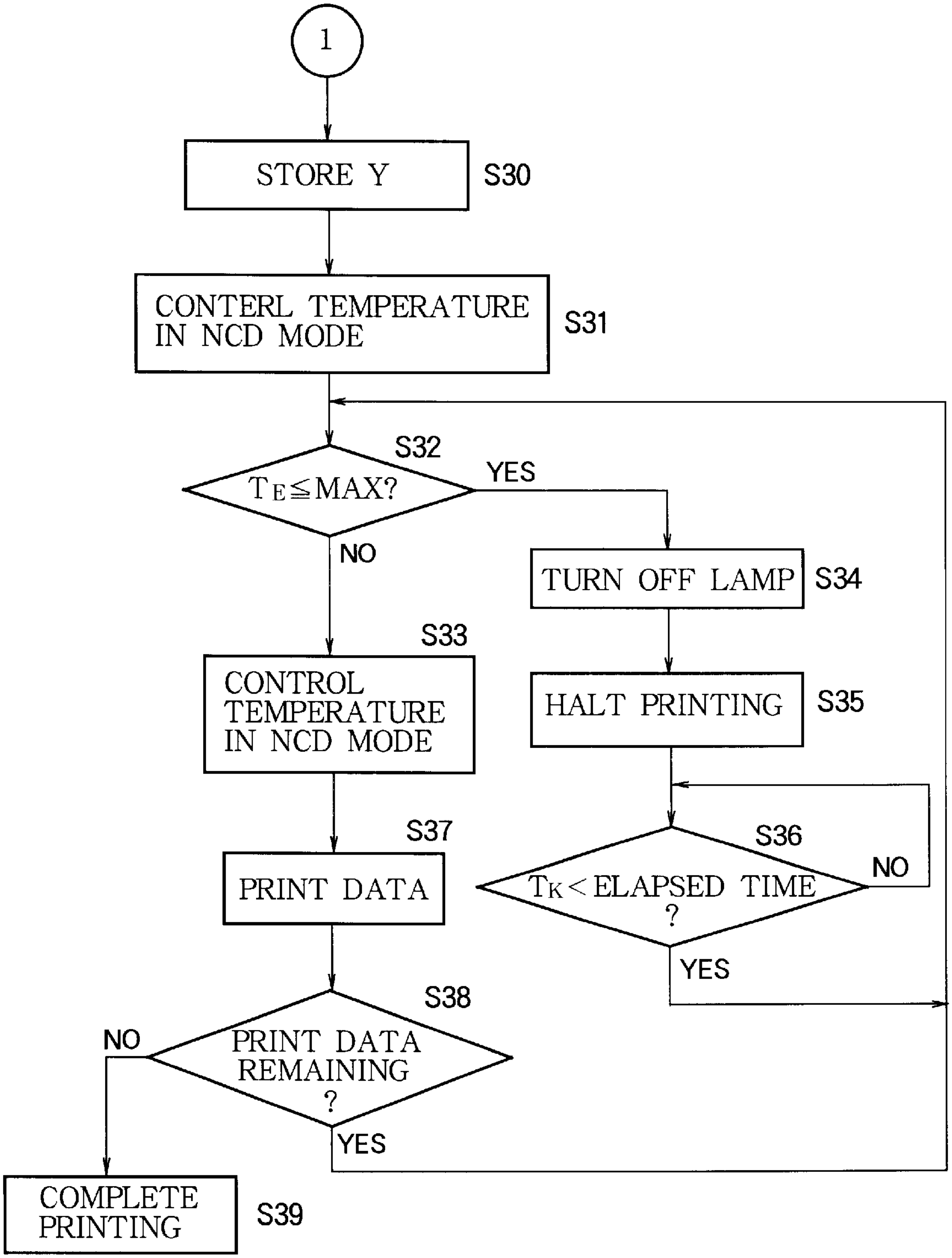

FIGS. 19–21 are flowcharts illustrating a procedure of the seventh embodiment.

Figure 22:
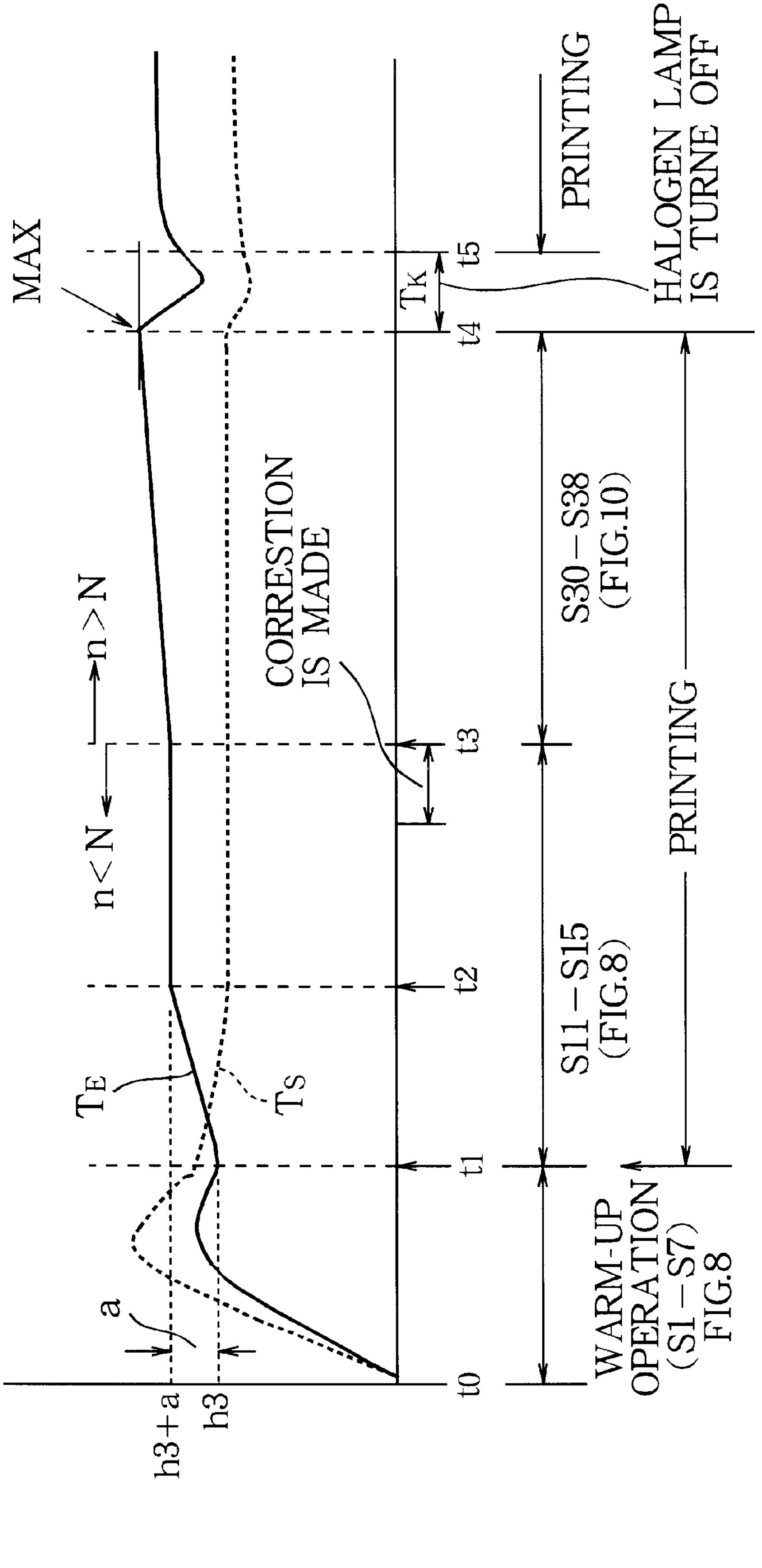
FIG. 22 is a timing chart illustrating the operation of various parts of the control system 1 when the control system operates according to the flowchart of FIGS. 19–21.

FIG. 22 is a timing chart illustrating the operation of various parts of the control system 1 when the control system operates according to the flowchart of FIGS. 19–21.

FIG. 22 shows the relationship between a temperature $T_M$ and a temperature $T_E$ when continuous printing is performed on more than N pages of a print medium.

The temperature $T_M$ is a temperature at a longitudinally middle M of the heat roller 1 detected by the non-contact type temperature detector 40. The temperature $T_E$ is a temperature at an area of the heat roller not in contact with the print medium detected by the contact type temperature detector 30.

The controller 2 of the control system 1 of FIG. 12 performs specific steps.

The flowcharts of FIGS. 19–21 will be described with reference to FIG. 22.

Upon receiving a print command at step S1 of FIG. 19, a decision is made at step S2 to determine whether the printing operation is continuous printing. Continuous printing is a printing mode during which a plurality of pages are printed and the heat roller 1 and the pressure roller 107 are continuously rotating. In the following description, the printing operation assumes to be activated immediately after the warm-up operation that is carried out upon power up.

If it is determined at step S2 that the printing operation is not continuous printing, the program proceeds to step S3. At step S3, the heater 2 is turned on and off to perform temperature control such that the temperature $T_E$ is maintained to a target temperature H in the CD mode. The target temperature H is initially set to h3 at step S4. The temperature control is continued until step S6 is completed.

If it is determined at step S2 that the printing operation is continuous printing, then the program proceeds to step S7 where a decision is made to determine whether n>N. The n is the number of pages to be printed and is loaded into a counter, not shown. If n>N at step S7, then the program proceeds to steps S8–S15 where temperature control is performed in the CD mode. In other words, the halogen lamp is cycled on and off such that the temperature $T_E$ is maintained to the target temperature H. The temperature control using the contact type temperature detector 30 continues until the temperature control is switched at later described step S31 (FIG. 21) to the temperature control using the non-contact type temperature detector 40.

FIG. 22 is a graph showing the relationship between the actual surface temperature $T_S$ at the point M and the temperature $T_E$ at the point E when the temperature control is performed through steps S8–S15. The temperature control starts when the target temperature H is set to H=h3 and the number n is set to n=0 (zero) at step S10. Steps S9–S10 are performed at time t1 the control FIG. 22 and steps S8–S15 are repeated until time t3.

When the print medium passes between the heat roller and the pressure roller, the heat of an area of the heat roller in contact with the print medium is lost to the print medium. As a result, the temperature of the area decreases with increasing number of pages of print medium to be printed and then reaches equilibrium in which the difference in temperature between the area in contact with the print medium and an area outside the area in contact with the print medium is α and remains constant for some time after the print medium has passed.

Steps S11–S15 are the same as steps S23–S28 of FIG. 20 and are performed during the period between times t1–t3. In other words, the target temperature H is incremented by a predetermined value β every time one page is printed. As the number of printed pages increases, the target temperature H is increased until H=h3+a at step S14 at time t2. Thereafter, H=h3+α is maintained after t2. Once the target temperature reaches H=h3+α, then steps S11–S14 are iterated, i.e., step S15 is not performed. Steps S11–S15 are iterated until n>N at step S13.

When n>N at step S13, then the program proceeds to step S30 of FIG. 21 where the temperature $T_M$ is loaded into a register. The temperature $T_M$ stored in the register is used as a target temperature Y. Then, the heater 2 is controlled at step S31 to turn on and off such that the temperature $T_M$ is the same as the target temperature Y (i.e., NCD mode). The temperature control in the NCD mode continues until the printing is completed at later described step S35 or step S39.

If n<N at step S7, then the program jumps to step S20 of FIG. 20. At steps S20–S26, the heater 2 is turned on and off to perform temperature control in the CD mode such that the temperature $T_E$ is maintained to a target temperature H=h3. This temperature control continues until step S26 has been completed. The target temperature H is set to h3 at step S21 and the counter is set to n=0 (zero) at step S22.

Steps S23–S25 and S27–S28 are the same as steps S11–S12 and S14–S15 of FIG. 19. One page is printed at step S23 and the counter is incremented by one, i.e., n=n+1 at step S24. At step S25, a decision is made to determine whether there is any remaining data. If NO at step S25, then the program proceeds to step S26 where printing is completed. If YES at step S25, then the program proceeds to step S27.

At step S28, the target temperature H is increased by β to offset the loss of heat. In other words, the target temperature H is incremented by b° C. every time one page is printed. Steps S23–S25 and S27–S28 are iterated to print on a plurality of pages. As the number of printed pages increases, the target temperature H is increased until H=h3+α at step S27. Thereafter, H=h3+α is maintained. When all the print data has been printed, the printing operation is completed at step S26.

The procedure of FIG. 21 begins at time t3 of FIG. 22 and is repeated for the period between time t3 and time t4. At step S32, a decision is made to determine whether $T_E$≦MAX. MAX is a highest tolerable value of temperature $T_E$ over which temperature should not be increased, and is determined by taking the temperature resistance of the associated components into account. If NO at step S32, then steps S32, S33, S37, and S38 are performed to continue to print from time t3 to time t4 (FIG. 22).

Thus, the surface temperature $T_M$ of the area 1*a* of the heat roller 1 in contact with the print medium can be maintained to h3, even if the temperatures of the areas 1*a* and 1*b* differ by more than a during the printing operation due to changes in external temperature. The value a is the difference in temperature between an area in contact with the print medium and an area outside the area when the temperature of the area decreases to reach equilibrium with increasing number of printed pages. However, temperature T*E* increases as a result of the temperature control.

When $T_E$>MAX at step S32, then the program proceeds to step S34 where the heater 2 is turned off, and then proceeds to step S35 where the printing is stopped. It is to be noted that the printing is halted but the heat roller 1 and pressure roller 107 continue to rotate. The program waits a certain period of time Tk, and then loops back to step S32. When $T_E$≦MAX at step S32, the temperature control is resumed at step S33 to turn on and off the heater 2 in the NCD mode such that temperature $T_M$ is maintained to the target temperature Y, and the printing is restarted at step S37. Step S33 is performed at time t5 of FIG. 22. The printing operation is continued until it is determined at step S38 that there is remaining print data and the printing operation is completed at step S39.

In the seventh embodiment, the non-contact type temperature detector 40 is used to detect the temperature of the heat roller before the halogen lamp is turned on. Instead, the contact type temperature detector 30 may be used to detect the temperature of the heat roller before the halogen lamp is turned on.

In the seventh embodiment, when the number of printed pages reaches a certain value N, the temperature control is switched from the CD mode to the NCD mode. However, the temperature control is not limited to this and the temperature control may be performed based on, for example, an elapsed time from when continuous printing is begun.

Eighth Embodiment

Figure 23:
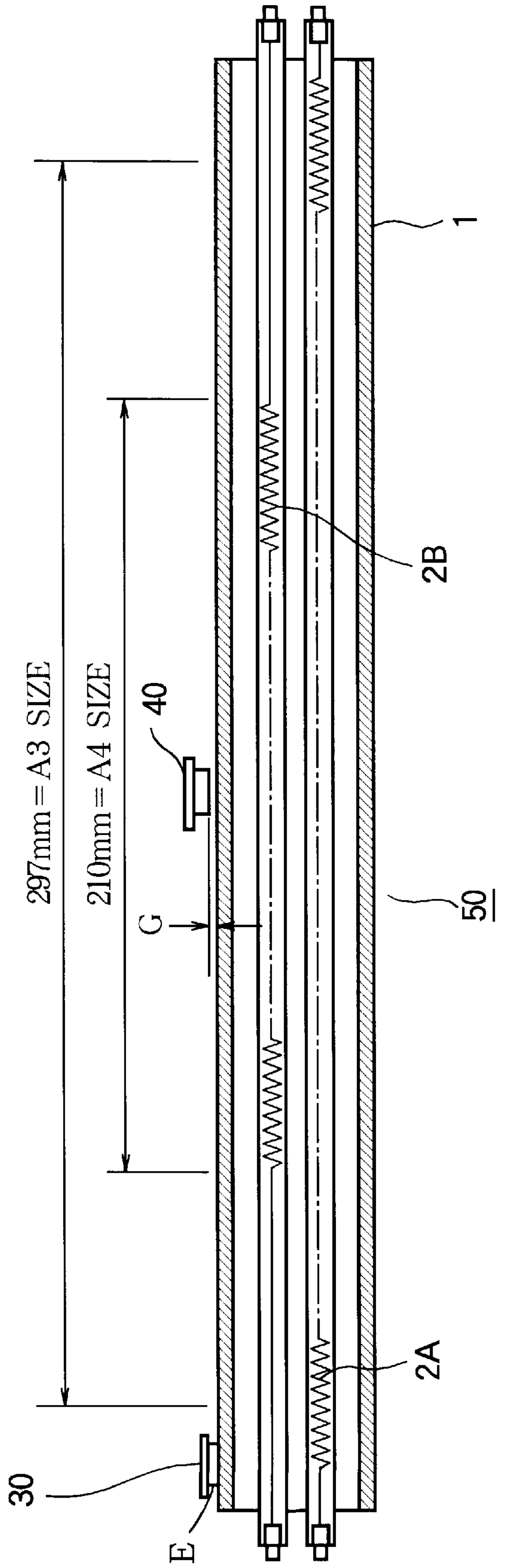
FIG. 23 is a partially cross-sectional view illustrating a heat roller and heater and 2B assembled therein.

FIG. 23 is a partially cross-sectional view illustrating a heat roller 1 and heater 2A and 2B assembled therein. The heaters 2A and 2B take the form of a halogen lamp.

A contact type temperature detector 30 is disposed at the point E, which is outside of an area in contact with a print medium having a maximum width that the fixing unit can accept. The contact type temperature detector 30 is directly in contact with the coated surface of the heat roller 1. A non-contact type temperature detector 40 is disposed substantially in the longitudinally middle portion of the heat roller 1 and faces the surface of the heat roller 1 with a gap G of about 1 mm therebetween. The heat roller 1 has heaters 2A and 2B that serve as a heat source. The heater 2A has an effective length that generates heat for fixing a print medium having A3 size (297×420 mm). The heater 2B has an effective length that generates heat for fixing A4 size print medium having a width of about 210 mm. The rest of the construction is the same as the fixing unit of the first embodiment.

Figure 24:
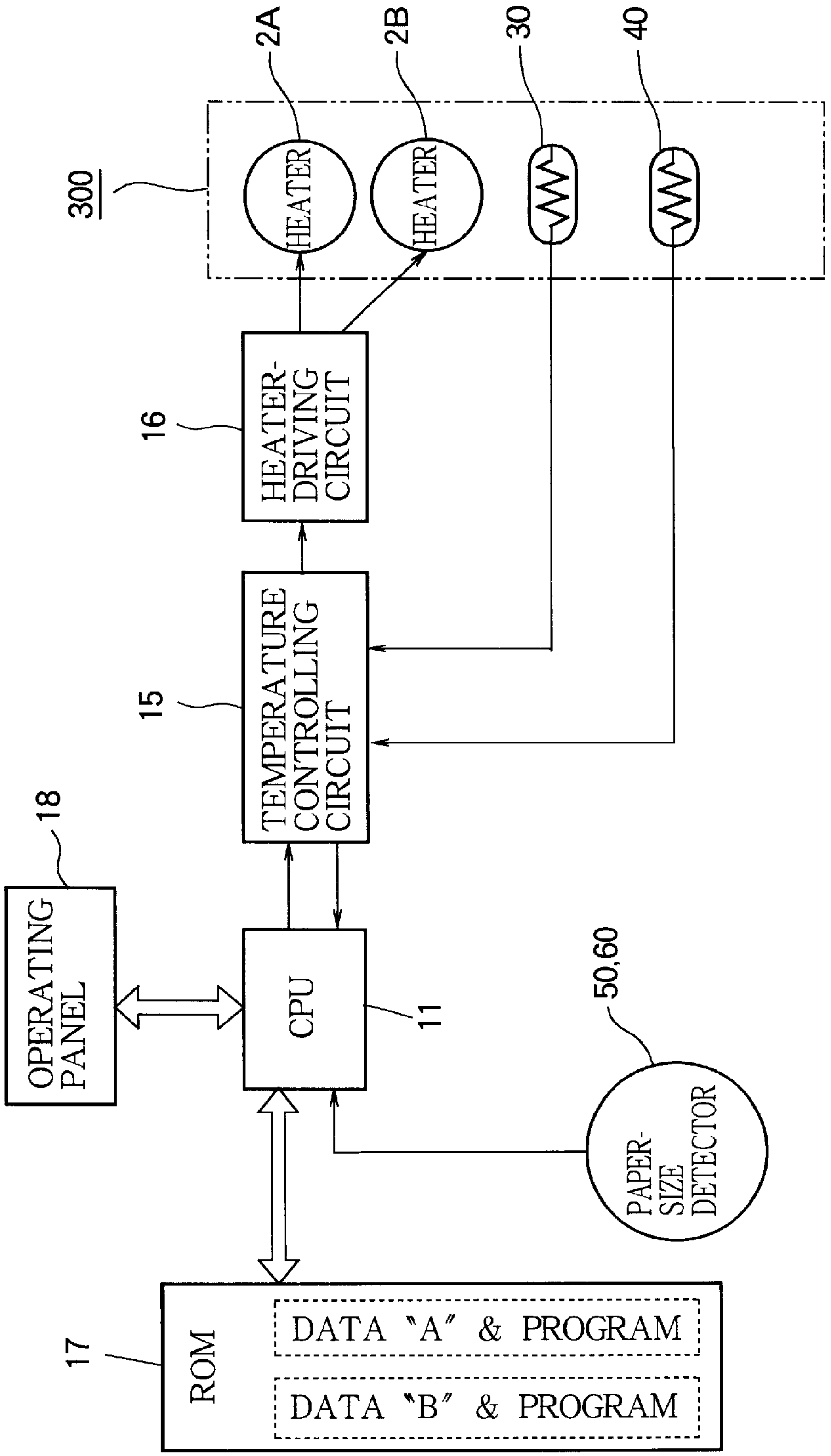
FIG. 24 is a block diagram illustrating a control system for controlling the fixing temperature.

FIG. 24 is a block diagram illustrating a control system for controlling the fixing temperature.

The control system includes paper-size detectors (switches) 50, 60, an operating panel 18, a CPU 11, a ROM 17, a temperature-controlling circuit 15, a heater-driving circuit 16, and a fixing unit 300. The temperature-controlling circuit 15 converts information read from the ROM 14 into a controlling signal and provides the control signal to the heater-driving circuit 16, which in turn drives the two heaters 2A and 2B to emit light and heat. The temperature-controlling circuit 15 also monitors the temperatures of the heat roller 1 detected by the contact type temperature detector 30 and the non-contact temperature detector 40. The temperature-controlling circuit 15 controls the heater-driving circuit 16 in accordance with the detected temperatures to switch on and off an a-c voltage supplied to the heaters 2A and 2B.

Figure 25:
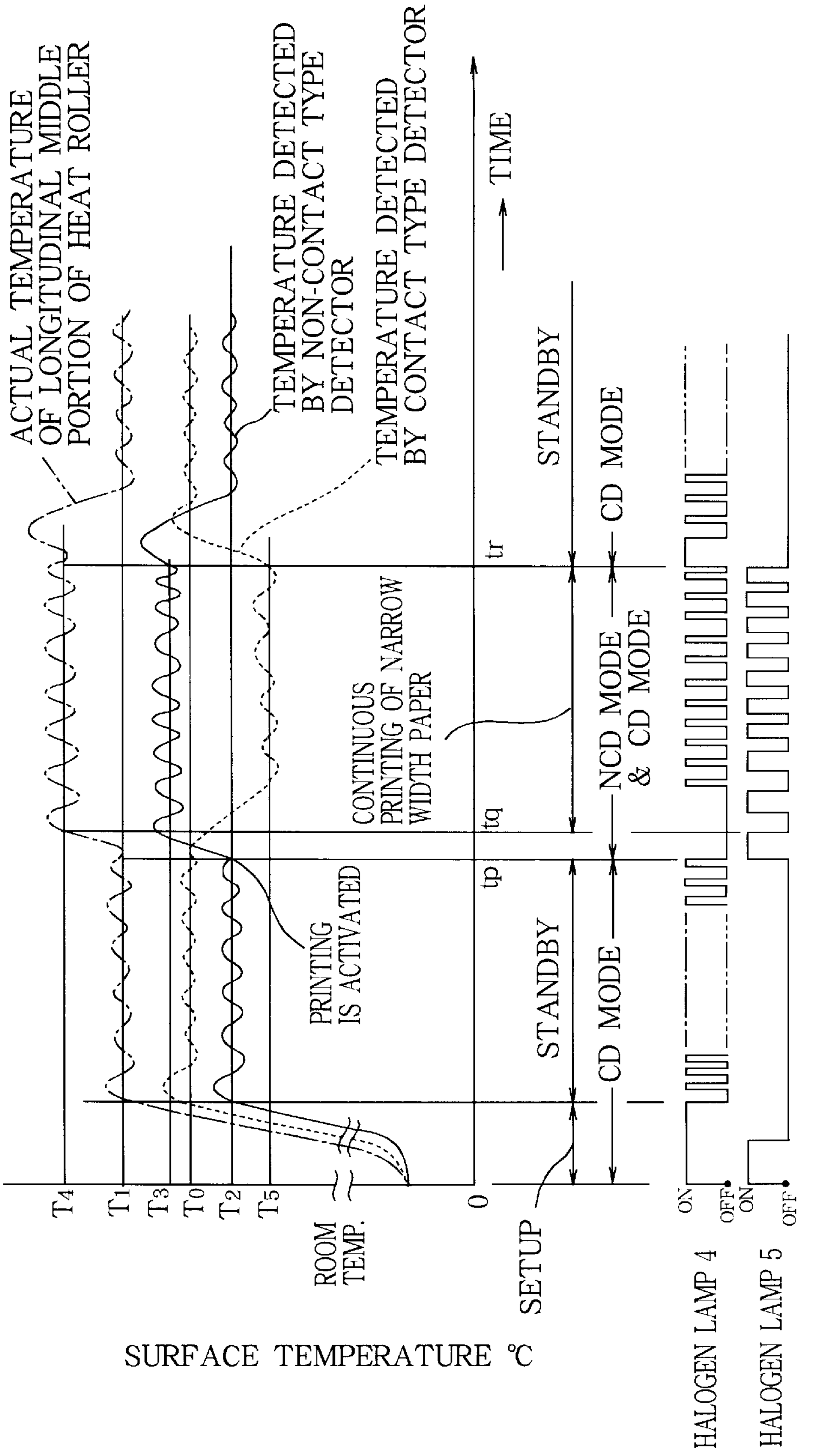
FIG. 25 is a timing chart that illustrates the control operation for controlling the surface temperature of the heat roller.

FIG. 25 is a timing chart that illustrates the control operation for controlling the surface temperature of the heat roller 1. FIG. 25 shows temperatures of various parts of the heat roller 1 at a setup state, a standby state, and a continuous printing state when print data is printed on a narrow-width print medium.

Referring to FIG. 25, a solid line curve indicates temperatures detected by the non-contact type temperature detector 40. A dot-dash line curve represents actual temperatures of a surface area on the heat roller that opposes the non-contact type temperature detector 40. A dotted line curve shows temperatures detected by the contact type temperature detector 30. It is to be noted that the temperatures represented by the dot-dash line are higher than temperatures indicated by the solid line. This is because there is a small gap G between the surface of the heat roller and the non-contact type temperature detector 40.

T0 is a target temperature of temperature of a left end portion E of the heat roller 1, detected by the contact type temperature detector 30 during the standby state. T1 is an average value of actual temperatures of the longitudinal middle of the heat roller 1 during the standby state. T2 is an average value of detection temperatures of the longitudinal middle of the heat roller 1, detected by the non-contact type temperature detector 40, during the standby state. T3 is a target value of temperatures detected by the non-contact type temperature detector 40 during the continuous printing state of a narrow-width print medium. T4 is a target value of actual temperature of the longitudinal middle of the heat roller 1 during the continuous printing state of the narrow-width print medium. T5 is a lower limit value of the temperature of the left end portion of the heat roller 1. The temperature of the left end portion of the heat roller 15 detected by the contact type temperature detector should not decrease below T5.

Upon power-up of the printer, the heaters 2A and 2B are energized, the temperature control enters setup state where the temperature of the end portion of the heat roller 1 increases to T0. During the setup state, the temperature control is carried out in the CD mode. Both the heaters 2A and 2B are turned on only for an early period of the set up state. The heater 2B is then turned off, thereby preventing overshoot in temperature rise as the temperature of the heat roller 1 increases. In order to reduce overshoot so that the warm-up time is shorter in the setup state, the two heaters 2A and 2B should be turned on concurrently only for an optimum length of time. The power consumption of the lamps and the heat capacity of the heat roller 1 determine the time period during which the two heaters 2A and 2B are turned on. The optimum length of such time period is experimentally determined.

Then, the temperature control shifts from the setup state to the standby state. In the standby state, the temperature is controlled in the CD mode such that actual surface temperature of the heat roller 1 at the middle portion thereof is maintained to T1 higher than T0, and the left end portion is maintained to T0. T1 is determined by the temperature control based on the temperature T0 detected by the contact type temperature detector 30. The difference T1–T0 is a difference in actual temperature between the left end portion and the longitudinal middle portion of the heat roller 1.

Figure 26:
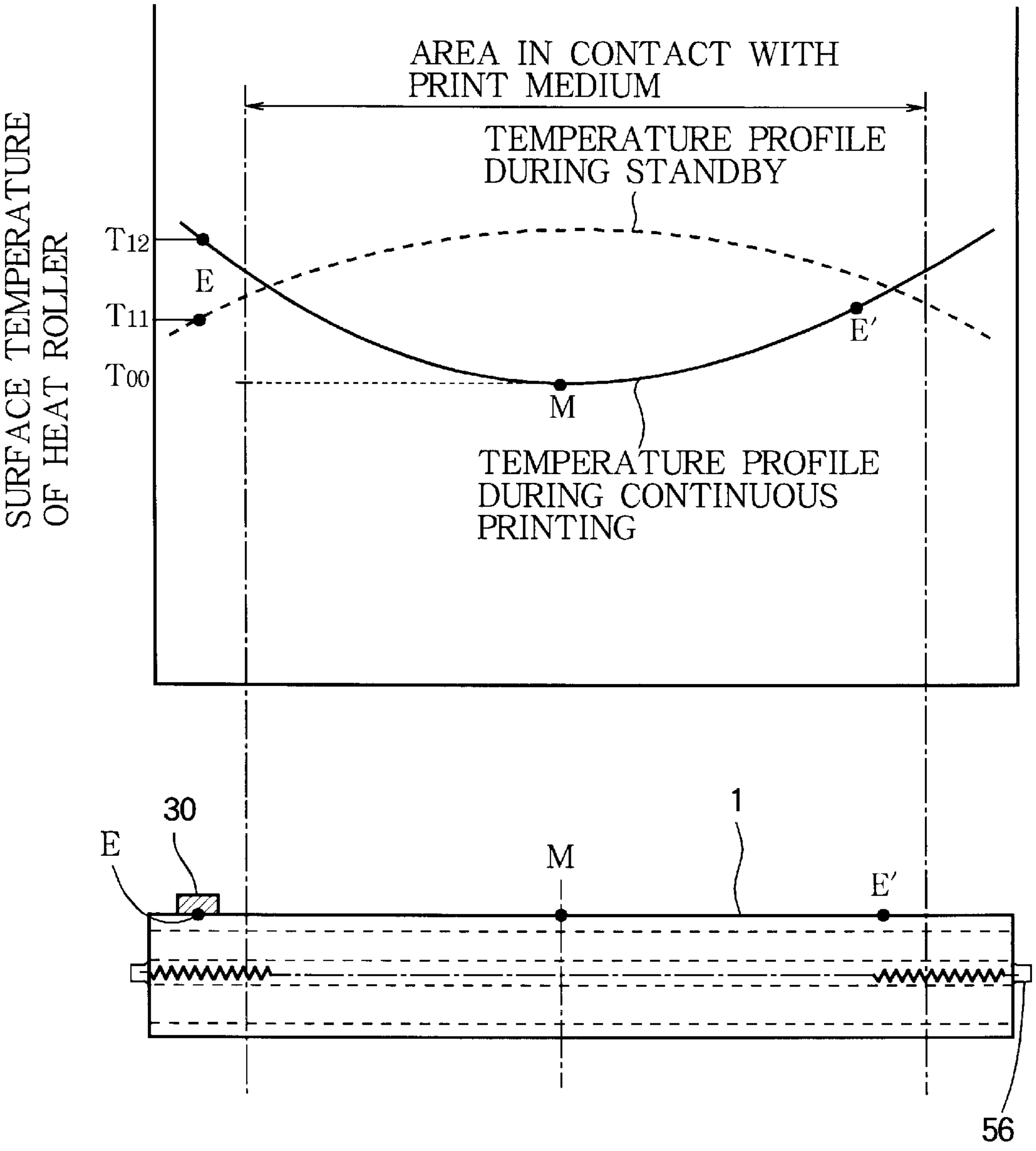
FIG. 26 illustrates the temperature profile across the length of the heat roller.

FIG. 26 illustrates the temperature profile across the length of the heat roller.

Referring to FIG. 26, the heat roller 1 usually has a curved temperature profile across its length with a low temperature T11 at both longitudinal ends and a high temperature in the middle. However, because there is a gap G of about 1 mm between the heat roller 1 and the non-contact type temperature detector 40, the temperature T2, detected by the non-contact type temperature detector 40, is lower than T1.

Upon a command at time tp for continuous printing of a narrow-width print medium, the temperature control is carried out in the NCD mode. In other words, when the operator specifies a print medium having a smaller width than A4 size paper in portrait orientation, or the paper size detectors 50, 60 (FIG. 24) detect such a print medium, the CPU 13 performs the temperature control based on the non-contact temperature detector 40.

Referring to FIG. 25, when the CPU 13 receives a print command at time tp, the CPU 13 forcefully terminates the standby state and begins a printing operation. The CPU 13 switches temperature control from the CD mode to the NCD mode. Then, the CPU 13 reads a fixing temperature controlling program corresponding to the size of the print medium from the ROM 14 and sends the program to the temperature-controlling circuit 15. Under the control of the program, the temperature control is carried out such that a temperature $T_M$ is equal to T3, which is the target value of temperatures detected by the non-contact temperature detector 40. Therefore, the actual temperature $T_S$ of the middle portion of the heat roller 1 varies back and forth about T4 within a predetermined range of error. Since the print medium has a narrower width than A4 size paper, the heater 2A is turned off and the heater 2B is turned on and the actual temperature $T_S$ at the middle portion of the heat roller 1 increases from T1 to T4.

Printing is activated at time tp and the actual temperature $T_S$ of the middle portion of the heat roller 1 reaches T4 at time tq. In order to ensure good fixing results, it is desirable that the actual temperature $T_S$ of the middle portion of the heat roller 1 reaches T4 before the leading end of the print medium reaches the heat roller 1. Thus, a time length tp–tq should be equal to or shorter than the time required for the print medium to reach the heat roller 1 after the printing is activated. In the eighth embodiment, the actual temperature $T_S$ of the middle portion of the heat roller 1 is increased from T1 to T4. The actual temperature $T_S$ of the middle portion of the heat roller 1 during the standby state may be selected to be T4, in which case temperature control is performed such that the temperature $T_M$ is equal to T3. This is advantageous when the electrophotographic printer operates at high printing speed and therefor the leading end of the print medium reaches the heat roller 1 in a shorter time.

During continuous printing, the heater 2B is energized and the temperature control is performed in the NCD mode where the non-contact type temperature detector 40 is used to perform the temperature control of the surface area of the heat roller 1 in contact with the print medium. This ensures that the actual surface temperature $T_S$ of the middle portion of the heat roller 1 is maintained at T4, which is a proper fixing temperature. However, when only the heater 2B is used to heat the heat roller 1, the temperature $T_E$ of the longitudinal end portions of the heat roller 1 will gradually decrease during the continuous printing operation. The decreases in the temperature $T_E$ of the longitudinal end portions of the heat roller 1 should be maintained within a certain range because there may be a case in which printing is performed on a wide-width print paper shortly after printing on a narrow-width print paper. In order to address such a situation, when the temperature detected by the contact type temperature detector 30 falls below T5, the heater 2A is also energized to increase the temperature of the longitudinal end portions of the heat roller 1 above T5. As described above, in the continuous printing, the temperature control can be advantageously performed using both the contact type temperature detector 30 and non-contact type temperature detectors 3.

At time tr at which the continuous printing is completed, the temperature control is switched from the NCD mode and the CD mode to the CD mode. At this moment, if the temperature detected by the contact type temperature detector 30 has fallen below T0, the heater 2A is energized to increase the temperature to T0. Energizing the heater 2A may cause the actual temperature $T_S$ of the middle portion of the to increase to a value higher than T4 and may also cause the temperature $T_M$ to increase to a value higher than T3. In order to minimize the temperature rise at the middle portion of the heat roller 1, the value of T5 should be selected to such that T5 is not too low compared to T0.

The T5 is preferably set to a temperature in the range from T0 to T0–10° C. Experiment showed that the range of (T0–10)<T5<T0 allows the temperature of the middle portion of the heat roller 1 to be maintained within a predetermined range over which fixing result is good.

Thus, the fixing unit according to the invention is capable of preventing not only temperature fall of the surface area of the heat roller through which the print medium passes but also excess temperature rise of the longitudinal end portions, which is outside of the surface area.

The non-contact type temperature detector 40. disposed at the middle portion of the heat roller is free from unwanted toner deposition, preventing contamination of the print paper and unstable temperature control of the heat roller. The non-contact type temperature detector 40 eliminates a cleaning member such as a cleaning felt and maintenance associated with oil such as silicone oil, ensuring good print results at all times.

The non-contact type temperature detector 40 does not frictionally slide on the heat roller 1 by nature, therefore the coating layer on the surface of the heat roller 1 will not wear out quickly, prolonging the lives of components as well as ensuring good print results.

Ninth Embodiment

The gap G between the non-contact type temperature detector 40 and the heat roller 1 may vary over time. Changes in gap G will cause the temperature difference between actual temperature of longitudinal middle of the heat roller 1 and the temperature detected by the non-conduct type temperature detector 40. In addition, the rotating surface of the heat roller 1 creates convection of air surrounding the heat roller 1, which in turn causes changes in the temperature detected by the non-contact type temperature detector 40.

Some measure should be taken in order to solve the problem of changes in gap G over time. However, maintaining an accurate gap is difficult. Instead, the temperature control can be performed most efficiently through the use of the following correction method in which the temperature is controlled in accordance with the size of gap G.

The method of correcting the temperature control by the use of the non-contact type temperature detector 40 will described in detail.

Figure 27:
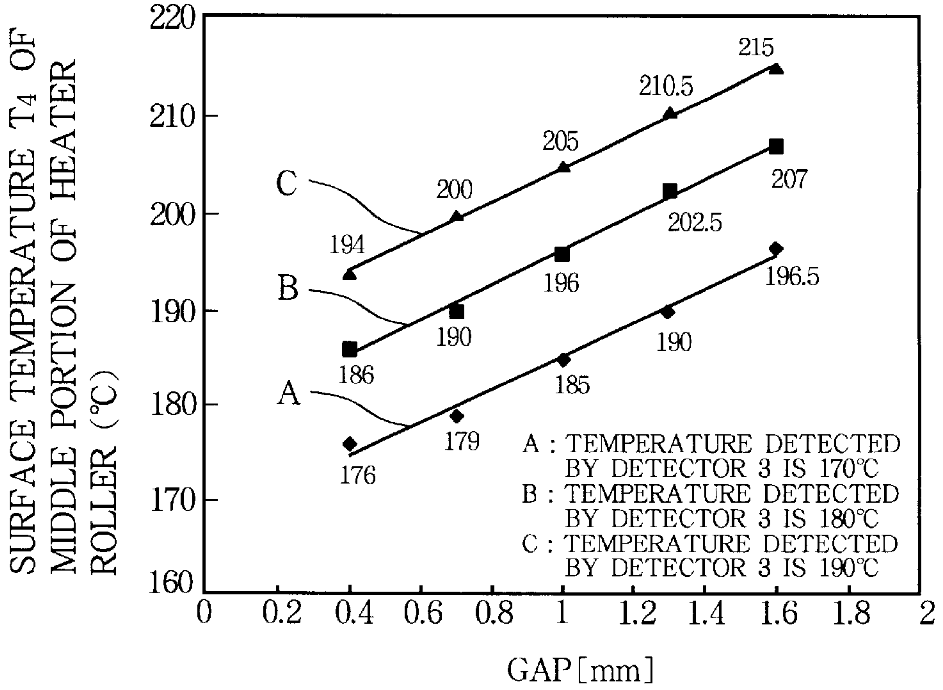
FIG. 27 illustrates the relationship between the actual surface temperatures of the heat roller and the gaps G between the heat roller and the non-contact type temperature detector.

FIG. 27 illustrates the relationship between the actual surface temperatures of the heat roller 1 and the gaps G between the heat roller 1 and the non-contact type temperature detector 40. Curves A–C show actual surface temperatures versus the gaps for different detection temperatures, detected by the non-contact temperature detector 40. Curve A shows a case where the detection temperature is 170° C., Curve B shows a case where the detection temperature is 180° C., and Curve C shows a case where the detection temperature is 190° C. In the ninth embodiment, the heat roller 1 has an outer diameter of 36 mm and a thickness of 1.2 mm, and the heater 2B has a power rating of 600 W and a length sufficient for fixing A4 size paper (about 210 mm in width).

As is clear from FIG. 27, there is a linear relation between the gap and the surface temperature in each case. For example, when the detection temperature of the middle portion of the heat roller is 180° C., the actual surface temperatures are about 196° C. for gap=1 mm, 190° C. for gap=0.7 mm, and 202.5° C. for gap=1.3 mm, respectively. In other words, the difference between the actual temperature and detection temperature is large for a large gap, and small for a small gap. Moreover, regardless of the detection temperature, the actual surface temperature is 9 to 10° C. higher than the detection temperature for gap=0.7 mm and 15 to 16° C. higher than the detection temperature for gap=1 mm. The ROM 14 (FIG. 24) stores a fixing temperature-controlling program and "data A" that describes the relation between the gaps and actual surface temperatures for different detection temperatures shown in FIG. 27.

Figure 28:
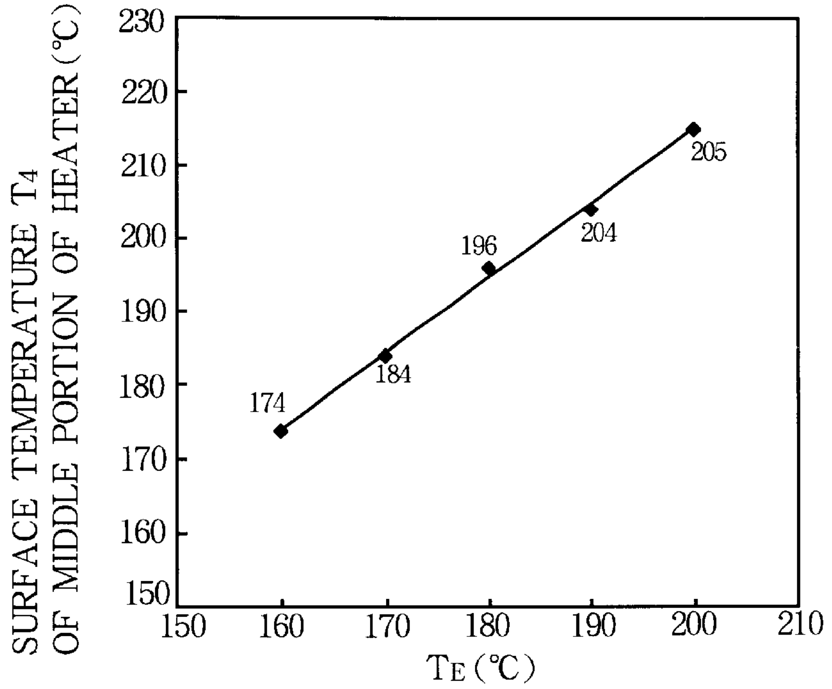
FIG. 28 illustrates the relationship between the actual surface temperatures of the middle portion of the heat roller and the temperatures of the left end portion of the heat roller when the temperature control is performed based on the contact type temperature detector.

FIG. 28 illustrates the relationship between the actual surface temperatures of the middle portion of the heat roller 1 and the temperatures of the left end portion of the heat roller 1 when the temperature control is performed based on the contact type temperature detector 30. In other words, the temperature control is performed in the CD mode. It is to be noted that actual surface temperatures of the middle portion of the heat roller 1 are linearly related to temperatures of the left end portion of the heat roller 1. The heat roller 1 used to measure the relationships of FIG. 28 is the same in material, shape, and size as that used to measure the relationships of FIG. 27. In the standby sate, as shown in FIG. 26, the heat roller 1 has a curved temperature profile across its length with a low temperature T11 at both longitudinal ends and a high temperature in the middle.

The temperature profile across the heat roller 1 depends on the heat capacity of the heat roller 1, the amount of heat generated by the heaters 2A and 2B, and light radiation pattern of the heaters 2A and 2B. The measured data in FIG. 28 indicates that detection temperature is generally 14 to 16° C. higher than the temperature of the left end portion of the heat roller 1. Thus, the ROM 14 (FIG. 24) stores a fixing temperature-controlling program and "data B" that describes the relation between the actual temperatures of the middle portion of the heat roller and the temperatures of the left end portion of the heat roller 1 shown in FIG. 28.

Thus, the ROM 14 stores both data A and data B and associated control programs. The contact type temperature detector 30 detects the temperature at the left end portion of the heat roller 1 and the non-contact type temperature detector 40 detects the temperature of the middle portion of the heat roller. The size of gap can be determined fairly accurately by using the correlation between the temperature detected by the contact type temperature detector 30 and the surface temperature detected by the non-contact type temperature detector 40.

{Method of Correcting Control Temperature}

The method of correcting control temperature in the NCD mode will be described. It is assumed that data A and dataB have default values for gap=1 mm and target value T3=180° C., detected by the non-contact temperature detector 40.

Here, it is assumed that the temperature correction is performed when the fixing unit is in the standby state. From data B (FIG. 28) read from the ROM 14, T4 is around 196° C. for T3=180° C. At this moment, if the temperature detected by the non-contact temperature detector is 170° C., then data A (FIG. 27) is read from the ROM 14. From the values of T4 and T3, it is determined that the gap=1.6 mm. Thus, the gap between the surface of the heat roller 1 and the non-contact type temperature detector 40 deviates 0.6 mm from the default value of 1 mm.

Upon activation of continuous printing of a narrow-width print medium, the temperature control is switched from the CD mode to the NCD mode. Here, it is assumed that the temperature control is to be performed such that T4=205° C. with, for example, T3=190° C., i.e., the temperature control is to be carried out by using Curve C of FIG. 27. However, since it has been determined that the gap=1.6 mm, the temperature control using Curve C will result T4=215° C. as shown in FIG. 27, which is about 10° C. higher than T4=205° C. Thus, in order to perform a temperature control equivalent to that based on Curve C of FIG. 27, Curve B should be used so that T3=180° C. gives T4=207° C. for gap=1.6 mm. Thus, the temperature control can be performed such that T4=207° C., which is very close to T4=205° C.

When data A for a default value of the gap G cannot be used due to changes in gap, the use of data A and data B can control the surface temperature of the middle portion of the heat roller 1 to a desired value or very close to it. This enables temperature control regardless of changes in gap over time.

FIG. 27 illustrates only three cases of 170° C., 180° C., and 190° C. of the detection temperature detected by the non-contact type temperature detector 40. The non-contact type temperature detector 40 in the form of a thermistor usually has a resolution of 2 to 3° C. and therefore closer detection temperatures can be employed for a temperature control having higher resolution.

The aforementioned correction of the target value of detection temperatures, detected by the non-contact type temperature detector 40, can be automatically carried out. For example, a default value of the gap G may be set to 1 mm at the factory. The printer may be programmed such that every time the printer is turned on, automatic correction is performed immediately before the heater 2A for wide-width medium is turned off at the end of the standby state. This automatic correction ensures that the temperature control is properly carried out at all times.

Tenth Embodiment

When the temperature control is performed based on the temperature detected by a non-contact type temperature detector, detected temperatures may be affected by convection of air surrounding the temperature detector and/or flow of air created by a built-in fan. Therefore, a non-contact type temperature detector does not respond as quickly to heat as a contact type temperature detector. Recent non-contact type heat-sensitive elements are in the form of a thermistor of a miniature bead type and a thin-film type having a small heat capacity, and they are as sensitive to heat as contact-type thermistor elements. However, the non-contact type thermistor becomes less responsive to changes in heat with increasing gap between the heat source and the thermistor. As a result, the controlled temperature has a larger ripple or fluctuation in the non-contact type thermistor than in the contact type thermistor.

Figure 29A:
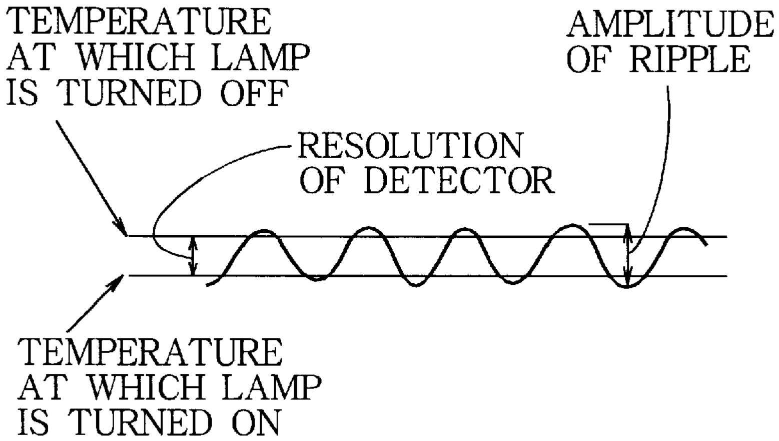
FIGS. 29A–29B illustrate the outline of the correction procedure of temperature ripple.
Figure 29B:
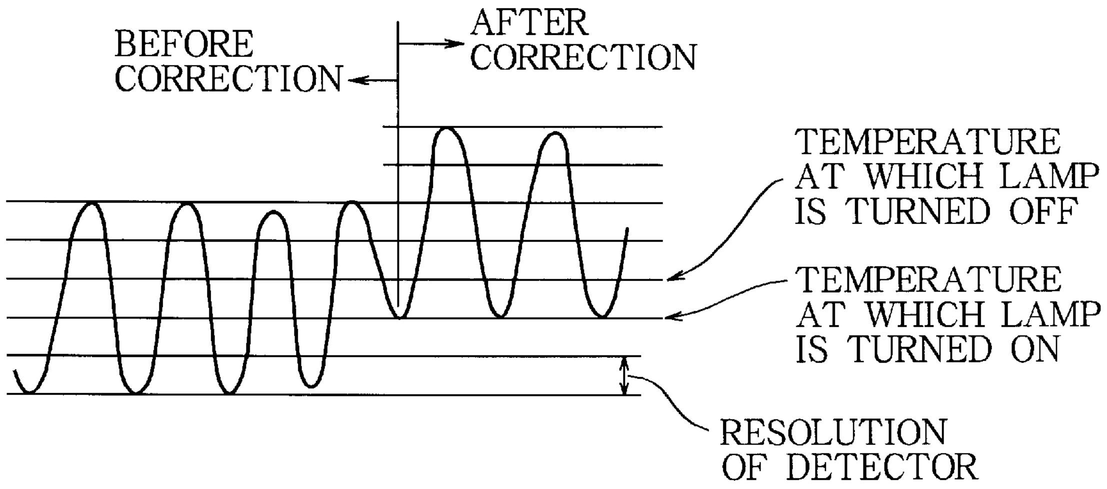

A tenth embodiment is characterized in that the target value of the temperature $T_M$ is increased in accordance with the amplitude of ripple or fluctuation of $T^s$. FIGS. 29A–29B illustrate the outline of the correction procedure of temperature ripple.

FIG. 29A illustrates the ripple in the surface temperature of the left end portion of the heat roller 1 when the temperature control is performed with the contact type temperature detector 30 is used.

Describing a ripple-like curve, the surface temperature varies within or slightly beyond a temperature range having a lower limit temperature at which the halogen lamp should be turned on and an upper limit temperature at which the halogen lamp should be turned off.

FIG. 29B illustrates the ripple in the surface temperature of the middle portion of the heat roller 1 when the temperature control is performed using the non-contact type temperature detector 40.

The heat responsiveness of the non-contact type temperature detector 40 often causes a ripple in the surface temperature of the middle portion of the heat roller. This ripple in the surface temperature has an amplitude of about five times the ripple in the responsiveness of the non-contact type temperature detector. If, for example, the amplitude of ripple is greater than 10° C., the fixing results may not be good enough at temperatures near the lower limit temperature. Large amplitudes of the ripple in the surface temperature seriously affect the fixing results of thick print medium such as a post card and an envelope.

The following is the temperature control according to the tenth embodiment performed by the control system of FIG. 24.

The temperature-controlling circuit 15 detects the amplitude of ripple in the temperature detected by the non-contact type temperature detector 40 during continuous printing. The ROM 14 stores a ripple-correcting program and "data C" that describes the relation between the amplitude of ripple in the heat responsiveness of the non-contact type temperature detector 40 and the target value of the surface temperature of the heat roller.

In the tenth embodiment, it is assumed that the non-contact type temperature detector 30 has an amplitude of ripple in the responsiveness of, for example, 10° C. If the. resolution of the non-contact type temperature detector 40 is 2° C., then the amplitude of 10° C. is equal to 10° C.÷2° C.=5. Then, it is defined that the amplitude of ripple is 5 units. Then, an actual target value of the surface temperature of the heat roller 1 is set 2 units higher than a desired target value. Likewise, if the amplitude of ripple in the responsiveness is equal to 6 units, then the target value is set 3 units higher than the desired value. For larger amplitudes, the target value is increased by one unit for every one unit of the amplitude of ripple. The temperature-controlling circuit 15 determines the setting of target value according to the data C that is read out of the ROM 14. The ROM 14 stores the data C and a ripple correcting program, not shown.

The temperature control performed using the non-contact type temperature detector 40 causes the actual surface temperature of the heat roller to gradually decrease by a small amount. In order to overcome such a drawback, the tenth embodiment is applicable to increase the target temperature stepwise.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A fixing unit for use in an image forming apparatus, comprising:

a heat roller, heating a toner image on a print medium;

a heater disposed in said heat roller and supplying heat to said heat roller;

a first temperature detector disposed in contact with a first surface area of an end portion of said heat roller outside of a second surface area of said heat roller with which the print medium passes in contact, said first temperature detector generating a first temperature data;

a second temperature detector disposed to oppose said heat roller, said second temperature detector being in proximity to a substantially middle portion of the second surface, said second temperature detector generating a second temperature data; and a controller, controlling supply of electric power to said heater, said controller switching based on the first temperature data and the second temperature data between a first temperature control mode where said controller controls supply of electric power to said heater such that the first temperature data is equal to a first target value, and a second temperature control mode where said controller controls supply of electric power to said heater such that the second temperature data is equal to a second target value.

2. The image forming apparatus according to claim 1, wherein when a fixing operation of the print medium has been completed, said controller switches from the second temperature control mode to the first temperature control mode.

3. The image forming apparatus according to claim 1, wherein if the second temperature data decreases below a certain value during the first temperature control mode, said controller switches from the first temperature control mode to the second temperature control mode.

4. The image forming apparatus according to claim 1, wherein when continuous printing is being performed in the first temperature control mode and a number of printed pages reaches a certain value, said controller switches from the first temperature control mode to the second temperature control mode.

5. The image forming apparatus according to claim 1, wherein said controller controls supply of electric power to said heater in the first temperature control mode during a standby state where the image forming apparatus waits for a print command;

wherein when the print medium has a width smaller than a reference width and the image forming apparatus receives a print command of continuous printing, said controller controls supply of electric power to said heater in the second temperature control mode.

6. The image forming apparatus according to claim 1, wherein said heater includes a first heater element having a first length and a second heater element having a second length shorter than the first length;

wherein when printing is performed on the print medium having a smaller width than a reference width, said controller supplies electric energy to the second heater element, said controller supplies electric energy to the second heater element and the first heater element if the first temperature data decreases below a lower limit.

7. The image forming apparatus according to claim 1, wherein when the first temperature data becomes equal to the first target value, said controller sets the second temperature data as the second target value.

8. The image forming apparatus according to claim 1, wherein said controller performs a correction operation in which the second temperature data is corrected to determine an approximate actual surface temperature of said heat roller;

wherein said controller stores a first correction value and a second correction value, the first correction value being a difference between the first temperature data and a first item of data that describes the actual surface temperature for a proper fixing operation, and the second correction value being a difference between the first temperature data and the second temperature data, wherein when said controller is performing a printing operation, said controller adds the first correction value and second correction value to the second temperature data, thereby determining the approximate actual surface temperature of said heat roller.

9. The image forming apparatus according to claim 8, wherein said controller performs a warm-up operation where when the print medium is not being passing through the fixing unit, said heat roller is rotated and said controller supplies electric power to said heater such that the actual surface temperature becomes the first item of data;

wherein the second correction value is determined immediately before the warm-up operation is halted.

10. The image forming apparatus according to claim 9, wherein said controller detects an initial value of a surface temperature of the heat roller after power up and before said controller supplies electric power to said heater;

wherein said controller performs the warm-up operation for a period of time in accordance with the initial value, the period of time being increased stepwise as the initial value decreases.

11. The image forming apparatus according to claim 9, wherein the initial value of the surface temperature is the second temperature data after power up and before said controller supplies electric power to said heater.

12. The image forming apparatus according to claim 1, wherein said second temperature detector opposes said heat roller with a gap therebetween, wherein said controller incorporates a control program in which a size of the gap is determined based on the first temperature data, the second temperature data, and the first items of data, and then the fixing temperature is controlled in accordance with the size of the gap.

13. The image forming apparatus according to claim 1, wherein when the first temperature data exceeds a certain value during the second temperature control mode, the controller halts printing;

wherein when the first temperature data decreases to a third target value after the first temperature has exceeded the certain value, the controller resumes printing.

14. The image forming apparatus according to claim 1, wherein when the first temperature data exceeds a first value during the second temperature control mode; said controller causes the print medium to be advanced at a low speed, and wherein when the first temperature data decreases to a second value after said controller has caused the print medium to be advanced at a low speed, said controller causes the print medium to be advanced at a high speed.

15. The image forming apparatus according to claim 1, wherein said controller incorporates a temperature control program in which an amplitude of ripple in the second temperature data is determined and the fixing temperature of the heat roller is corrected in accordance with the amplitude of ripple.

* * * * *